US012007146B2

(12) United States Patent
Houston et al.

(10) Patent No.: US 12,007,146 B2
(45) Date of Patent: Jun. 11, 2024

(54) VERTICALLY STACKED DUAL HEAT ENGINE RACK

(71) Applicant: Rinnai America Corporation, Peachtree City, GA (US)

(72) Inventors: Ansley Houston, Peachtree City, GA (US); Parth Patel, Peachtree City, GA (US); Rohan Scafe, Peachtree City, GA (US)

(73) Assignee: Rinnai America Corporation, Peachtree City, GA (US)

( * ) Notice: Subject to any disclaimer, the term of this patent is extended or adjusted under 35 U.S.C. 154(b) by 165 days.

(21) Appl. No.: 17/422,370

(22) PCT Filed: Jan. 10, 2020

(86) PCT No.: PCT/US2020/013106
§ 371 (c)(1),
(2) Date: Jul. 12, 2021

(87) PCT Pub. No.: WO2020/146746
PCT Pub. Date: Jul. 16, 2020

(65) Prior Publication Data
US 2022/0120473 A1      Apr. 21, 2022

Related U.S. Application Data

(60) Provisional application No. 62/915,791, filed on Oct. 16, 2019, provisional application No. 62/791,302, filed on Jan. 11, 2019.

(51) Int. Cl.
*F24H 9/06*       (2006.01)
*C02F 1/02*       (2023.01)
(Continued)

(52) U.S. Cl.
CPC ............... *F24H 9/06* (2013.01); *C02F 1/02* (2013.01); *C02F 5/025* (2013.01); *F24H 1/107* (2013.01); *F24H 9/139* (2022.01); *C02F 2209/02* (2013.01)

(58) Field of Classification Search
CPC .................................... F24H 9/06; F24H 1/06
See application file for complete search history.

(56) References Cited

U.S. PATENT DOCUMENTS 9,909,780 B2    3/2018   Humphrey et al.
10,072,873 B1   9/2018   Ostera et al.
(Continued)

FOREIGN PATENT DOCUMENTS

CA      2829601 A1    4/2015
JP      41002195      2/1966
(Continued)

OTHER PUBLICATIONS

International Preliminary Report on Patentability in Application No. PCT/US2020/013106, dated Jul. 22, 2021.
(Continued)

*Primary Examiner* — Steven S Anderson, II
(74) *Attorney, Agent, or Firm* — Quinn IP Law

(57) ABSTRACT

A water heater system includes a water heater rack system with a plurality of vertically stacked tankless water heaters and a water heater storage tank and provides the ability to install a water heater in environments where horizontally oriented heater rack systems would not fit. The tankless water heaters comprise a bifurcated vent arrangement with separate intake and exhaust vents. Accordingly, vent pipes of diameters of two (2) inches or less may be used in comparison to coaxial vent arrangements which may have diameters of three inches or more. The smaller vent pipe diameter allows a plurality of water heaters to be stacked, one above
(Continued)

the other, such that the water heater rack system has a maximum height of 76 inches or less. This vertical orientation may allow tankless water heaters to be installed in an environment where a horizontally configured plurality of tankless water heaters would not fit.

21 Claims, 13 Drawing Sheets

(51) Int. Cl.
*C02F 5/02* (2023.01)
*F24H 1/10* (2022.01)
*F24H 9/13* (2022.01)

(56) References Cited

U.S. PATENT DOCUMENTS

| | | | |
|---|---|---|---|
| D842,684 S | 3/2019 | House | |
| 10,760,823 B2 | 9/2020 | Knoblett et al. | |
| 2008/0152331 A1* | 6/2008 | Ryks | F24D 17/0031 392/490 |
| 2008/0216770 A1* | 9/2008 | Humphrey | F24H 1/145 122/13.3 |
| 2010/0031953 A1* | 2/2010 | Penev | F24D 17/0021 165/45 |
| 2013/0042635 A1 | 2/2013 | Nelson et al. | |
| 2015/0047578 A1* | 2/2015 | Lesage | F24H 1/185 220/694.1 |
| 2016/0003468 A1* | 1/2016 | Malone | F24D 1/005 122/15.1 |
| 2016/0061462 A1* | 3/2016 | Lowrimore | F25B 49/02 62/160 |
| 2019/0093923 A1 | 3/2019 | Bober et al. | |
| 2020/0393164 A1 | 12/2020 | Knoblett et al. | |

FOREIGN PATENT DOCUMENTS

| | | |
|---|---|---|
| JP | 2016095051 | 5/2016 |
| JP | 2016156524 | 9/2016 |
| WO | 2009/098991 A1 | 8/2009 |

OTHER PUBLICATIONS

PCT/US20/13106, International Search Report and Written Opinion dated May 11, 2020, 13 pages.

* cited by examiner

VERTICALLY STACKED DUAL HEAT ENGINE RACK

CROSS REFERENCE TO RELATED APPLICATIONS

This application is the national phase under 35 U.S.C. § 371 of PCT/US2020/013106 filed on Jan. 10, 2020, which claims the benefit of U.S. Application No. 62/791,302 filed Jan. 11, 2019 and U.S. Application No. 62/915,791, filed Oct. 16, 2019, the disclosures of which are expressly incorporated herein by reference in their entireties.

BACKGROUND

The need for heated fluids, and heated water, has long been recognized. Conventionally, water has been heated by heating elements, either electrically or with gas burners, while stored in a tank or reservoir. While effective, energy efficiency and water conservation using a storage tank alone can be poor. As an example, water that is stored in a hot water storage tank is maintained at a desired temperature. Thus, unless the storage tank is well insulated, heat loss through radiation can occur, requiring additional input of energy to maintain the desired temperature. In effect, continual heating of the stored water in the storage tank is required.

Many of the problems with traditional hot water storage tanks have been overcome using tankless water heaters. With the tankless water heater, incoming ground water passes through a component generally known as a heat exchanger and is instantaneously heated by heating elements (or gas burner) within the heat exchanger until the temperature of the water leaving the heat exchanger matches a desired temperature set by a user of the system. With such systems the heat exchanger is typically heated by a large current flow (or Gas/BTU input) which is regulated by an electronic control system. The electronic control system also typically includes a temperature selection device, such as a thermostat, by which the user of the system can select the desired temperature of the water being output from the heat exchanger.

Tankless water heaters are often used in conjunction with one another to heat cold water and recirculate water through a water heating system. Using multiple tankless water heaters together provides for large capacity and redundant operations in a small footprint.

A plurality of tankless water heaters may be mounted horizontally on rigid water heater stands and connected to a hot water storage tank through external ports and isolation valves. As such, the water heater stands are generally wider than a typical hot water storage tank. Tankless water heater racks with a plurality of tankless water heaters may generally be situated in locations that have enough space to house a wider water heater area than a single traditional integrated tank water heater.

SUMMARY

A first aspect of the disclosure provides a water heater rack system. The water heater rack system comprises a first post having a first end and a second end, the second end of the first post comprising a first support surface.

The water heater rack system comprises a second post having a first end and a second end, the second end of the second post comprising a second support surface, wherein the first and second support surfaces are coplanar. The water heater rack system comprises a first heat engine having a first surface coupled across the first post and the second post at a first location between the first and second end of the first and second posts, the first heat engine also having a second surface that is perpendicular to the first surface of the first heat engine, the second surface of the first heat engine having a first hot water outlet and facing towards the first and second support surfaces. The water heater rack system comprises a second heat engine having a first surface coupled across the first post and the second post at a second location between the first and second end of the first and second posts, the second heat engine also having a second surface that is perpendicular to the first surface of the second heat engine, the second surface of the second heat engine having a second hot water outlet and facing towards the first and second support surfaces.

In some implementations of the first aspect of the disclosure, the second heat engine in the water heater rack system further comprises a third surface that is opposite the second surface of the second heat engine, the third surface of the second heat engine having at least one vent pipe, wherein the second surface of the first heat engine faces that third surface of the second heat engine.

In some implementations of the first aspect of the disclosure, the water heater rack system further comprises a first support having a first end that rigidly connects to the first post at a point on the first post between the first end of the first post and the second end of the first post, and a second end that is coplanar with the second end of the first post and set apart from the first post in a direction parallel to the direction in which the first surface of the first heat engine extends away from the first post and the second post. The water heater rack system comprises a second support that rigidly connects to the second post at a point on the second post between the first end of the second post and the second end of the second post and a second end that is coplanar with the second end of the second post and set apart from the first post in a direction parallel to the direction in which the first surface of the first heat engine extends away from the first post and the second post and a linking bar that connects to the second end of the first support and the second end of the second support.

In some implementations of the first aspect of the disclosure, the first heat engine and the second heat engine are tankless water heaters.

In some implementations of the first disclosure, the water heater rack is modular where a section that supports the first heat engine is separable from a section that supports the second heat engine.

In some implementations of the first aspect of the disclosure, the first post and the second post of are parallel to each other.

In some implementations of the first aspect of the disclosure, the first support and second support each extend perpendicular to the first post and the second post and the second end of the first support and the second support each extend parallel to the first post and the second post.

In some aspects of the first disclosure, the water heater rack system further comprises a first cross bar and a second cross bar, each connecting the first post and the second post wherein the first cross bar is further away from the support surface than the second surface and wherein the first heat engine is coupled to the first cross bar through a first bracket and wherein the second heat engine is coupled to the second cross bar through a second bracket.

In some implementations of the first aspect of the disclosure, the length of the first post and the second post are each 76 inches or less.

A second aspect of the disclosure describes a water heating and storage system, comprising a storage tank with a top surface, a bottom surface, and a sidewall that extends between the top surface and the bottom surface, the storage tank encloses a volume. The water heating and storage system comprises a first post having a first end and a second end, the second end of the first post comprising a first support surface. The water heating and storage system comprises a second post having a first end and a second end, the second end of the second post comprising a second support surface where the longitudinal axis of the storage tank is parallel with the first post and the second post. The hot water heating and storage system comprises a first heat engine having a first surface coupled across the first post and the second post at a first location between the first and second end of the first and second posts, the first heat engine also having a second surface that is perpendicular to the first surface of the first heat engine, the second surface of the first heat engine having a first hot water outlet and facing towards the first and second support surfaces. The water heating and storage system comprises a second heat engine having a first surface coupled across the first post and the second post at a second location between the first and second end of the first and second posts, the second heat engine also having a second surface that is perpendicular to the first surface of the second heat engine, the second surface of the second heat engine having a second hot water outlet and facing towards the first and second support surfaces the water heating and storage system comprises a hot water inlet on the storage tank fluidically coupled to the first and second hot water outlets.

In some implementations of the second aspect of the disclosure, the water heating and storage system further comprises a first support having a first end that rigidly connects to the first post at a point on the first post between the first end of the first post and the second end of the first post, and a second end that is coplanar with the second end of the first post and set apart from the first post in a direction parallel to the direction in which the first surface of the first heat engine extends away from the first post and the second post. The water heating and storage system comprises a second support that rigidly connects to the second post at a point on the second post between the first end of the second post and the second end of the second post and a second end that is coplanar with the second end of the second post and set apart from the first post in a direction parallel to the direction in which the first surface of the first heat engine extends away from the first post and the second post. The water heating and storage system comprises a linking bar that connects to the second end of the first support and the second end of the second support.

In some implementations of the second aspect of the disclosure, the water heating and storage system further comprises a tank cold water inlet, a tank recirculation outlet positioned on the sidewall above the tank cold water inlet, a tank recirculation inlet positioned on the sidewall above the tank recirculation outlet, and a storage system recirculation outlet, the water heating and storage system comprises a recirculation pump positioned between the tank recirculation outlet and the storage system recirculation outlet, the recirculation pump comprising a pump inlet and a pump outlet. The water heating and storage system comprises an inlet isolation valve positioned between the tank recirculation outlet and the pump inlet, wherein the pump inlet is in fluid communication with the tank recirculation outlet when the inlet isolation valve is open, and wherein the pump inlet is fluidically isolated from the tank recirculation outlet when the inlet isolation valve is closed.

In some implementations of the second aspect of the disclosure the first heat engine and the second heat engine are tankless water heaters.

In some implementations of the second aspect of the disclosure the water heating and storage system of claim comprise a hot water outlet on the top surface of the storage tank, which is fluidically connected to the upper portion of the storage tank.

In some implementations of the second aspect of the disclosure, each outer vent pipe and each inner vent pipe have a 2-inch diameter.

In some implementations of the second aspect of the disclosure, the cold-water inlet is positioned on the sidewall about the bottom surface.

In some implementations of the second aspect of the disclosure, the tank recirculation inlet positioned along the sidewall at or above at least at 80% of the volume from the bottom surface.

In some implementations of the second aspect of the disclosure, the width of the first heat engine and the second engine are no larger than the width of the storage tank top surface and the storage tank bottom surface.

In some implementations of the second aspect of the disclosure, the first heat engine and the second heat engine are enclosed in a heat engine casing. In some implementations, the twentieth disclosure the width of heat engine casing is no more than the width of the storage tank top surface and the storage tank bottom surface. In some implementations, the water heating and storage system further comprises a first cross bar and a second cross bar, each connecting the first post and the second post wherein the first cross bar is further away from the support surface than the second surface and wherein the first heat engine is coupled to the first cross bar through a first bracket and wherein the second heat engine is coupled to the second cross bar through a second bracket.

In some implementations of the second aspect of the disclosure, the water heating and storage the water heating and storage system is controlled by an integrated control block.

In some implementations of the second aspect of the disclosure the water heating and storage system further comprises at least one storage tank connector on a second surface of the first post and at least one storage tank connector on a second surface of the second post.

A third aspect of the disclosure provides a water heater storage tank. The water heater storage tank comprises a top surface, a bottom surface, an inner sidewall that extends between the top surface and the bottom surface and enclosing an inner volume. The water heater storage tank comprises an outer sidewall that extends between the top surface and the bottom surface and encloses an outer volume between the inner sidewall and the outer sidewall, where the outer sidewall has an inner surface and an outer surface. The water heater storage tank comprises a cold-water inlet port that extends from the outer volume beyond the outer surface of the outer sidewall. The water heater storage tank comprises a first cold-water outlet port that extends from the outer volume beyond the outer surface of the outer sidewall. The water heater storage tank comprises a second cold-water outlet port that extends from the outer volume beyond the outer surface of the outer sidewall. The water heater storage tank comprises a cold-water manifold positioned within the outer volume and fluidically connected to each of the cold-water inlet port, the first cold-water outlet port, and the second cold-water outlet port. The water heater storage tank comprises a cold-water recirculation port that extends from the inner volume beyond the outer surface of the outer sidewall. The water heater storage tank comprises a first hot water inlet port that that extends from the outer volume beyond the outer surface of the outer sidewall. The water heater storage tank comprises a second hot water inlet port that extends from the outer volume beyond the outer surface of the outer sidewall. The water heater storage tank comprises a third hot water inlet port that extends from the inner volume to the outer volume. The water heater storage tank comprises a hot water manifold positioned within the outer volume and fluidically connected to each of the first, second, and third hot water inlet ports.

In some implementations of the third aspect of the disclosure aspect of the disclosure provides. The water heater and storage tank of claim 25 further comprising a second cold water inlet port.

A fourth aspect of the disclosure provides a water heater and storage tank system comprising a top surface, a bottom surface, an inner sidewall that extends between the top surface and the bottom surface and enclosing an inner volume, and an outer sidewall that extends between the top surface and the bottom surface and encloses an outer volume between the inner sidewall and the outer sidewall where the outer sidewall has an inner surface and an outer surface. The water heater and storage tank system comprises a first heat engine having a first surface coupled across the first post and the second post at a first location between the first and second end of the first and second posts, the first heat engine also having a second surface that is perpendicular to the first surface of the first heat engine, the second surface of the first heat engine having a first hot water outlet and facing towards the first and second support surfaces. The water heater and storage tank system comprises a second heat engine having a first surface coupled across the first post and the second post at a second location between the first and second end of the first and second posts, the second heat engine also having a second surface that is perpendicular to the first surface of the second heat engine, the second surface of the second heat engine having a second hot water outlet and facing towards the first and second support surfaces. The water heater and storage tank system comprises a cold-water inlet port that extends from the outer volume beyond the outer surface of the outer sidewall. The water heater and storage tank system comprises a first cold-water outlet port that extends from the outer volume beyond the outer surface of the outer sidewall. The water heater and storage tank system comprises a second cold-water outlet port that extends from the outer volume beyond the outer surface of the outer sidewall. The water heater and storage tank system comprises a cold-water manifold positioned within the outer volume and fluidically connected to each of the cold-water inlet port, the first cold-water outlet port, and the second cold-water outlet port. The water heater and storage tank system comprises a cold-water recirculation port that extends from the inner volume beyond the outer surface of the outer sidewall. The water heater and storage tank system comprises a first hot water inlet port that that extends from the outer volume beyond the outer surface of the outer sidewall. The water heater and storage tank system comprises a second hot water inlet port that extends from the outer volume beyond the outer surface of the outer sidewall. The water heater and storage tank system comprises a third hot water inlet port that extends from the inner volume to the outer volume. The water heater and storage tank system comprises a hot water manifold positioned within the outer volume and fluidically connected to each of the first, second, and third hot water inlet ports. The water heater and storage tank system comprises a pump between the cold-water recirculation outlet and the hot water inlet. The water heater and storage tank system comprises an isolation valve that connects between the tube, inlet, and outlet.

In some implementations of the fourth aspect of the disclosure all valves and tubes are enclosed at least partially in the outer volume.

In some implementations of the fourth aspect of the disclosure, the water heating and storage system further comprises a second cold water inlet port.

In some implementations of the fourth aspect of the disclosure, the heat engines are tankless water heaters.

In some implementations of the fourth aspect of the disclosure the water heater the outer space is filled with an insulating material.

In some implementations of the fourth aspect of the disclosure the water heating and storage system comprises a set of mounting studs are coupled to the inner sidewall and extend through the outer volume and beyond the outer surface of the outer sidewall, wherein the mounting studs are coupled to the first heat engine and the second heat engine In some implementations of the fourth aspect of the disclosure, the mounting studs are bolts with a spiral thread and fastened to the mounting points on the first heat engine and the second heat engine with a set of nuts that are interlocked with the spiral thread in the mounting studs.

In a fifth aspect of the disclosure, a water heater system has a height, depth, and width dimension. The water heater system comprises a rack comprising a base and a support that extends in a height direction from the base. The water heater system comprises a first water heater coupled to the support of the rack. The first water heater comprising a first top surface and a first bottom surface. The first bottom surface faces in a direction of the base. The water heater system comprises a second water heater coupled to the support of the rack. The second water heater comprising a second top surface and a second bottom surface. The second bottom surface faces in a direction of the base, and wherein the second top surface faces the first bottom surface.

In some implementations of the fifth aspect of the disclosure, the second top surface comprises a bifurcated air intake and exhaust vent for the second water heater.

In some implementations of the fifth aspect of the disclosure, the first bottom surface comprises a first cold water inlet of the first water heater and a first hot water outlet of the first water heater.

In some implementations of the fifth aspect of the disclosure, the second bottom surface comprises a second cold water inlet of the second water heater and a second hot water outlet of the second water heater. The water heater system further comprises a cold water inlet manifold fluidically coupled to the first cold water inlet and the second cold water inlet. The water heater system further comprises a hot water outlet manifold fluidically coupled to the first hot water outlet and the second hot water outlet.

In some implementations of the fifth aspect of the disclosure, the water heater system further comprises a recirculation pump in fluid communication with the cold water inlet manifold. The recirculation pump is adapted to supply water from a source to the cold water inlet manifold.

In some implementations of the fifth aspect of the disclosure, the water heating system further comprises a storage tank comprising a recirculation inlet and a recirculation outlet. The recirculation inlet of the storage tank is fluidically coupled to the hot water outlet manifold and the recirculation outlet of the storage tank is fluidically coupled to the recirculation pump as the source.

In some implementations of the fifth aspect of the disclosure, the storage tank further comprises a cold water inlet adapted to receive cold water from a cold water source and a hot water outlet adapted to supply hot water to a building premises.

In some implementations of the fifth aspect of the disclosure, the water heating system further comprises an untreated cold water inlet and a water treatment system. The water treatment system comprises a treatment inlet and a treatment outlet. The water treatment system is fluidically coupled to receive untreated cold water from the untreated cold water inlet and supply treated cold water to the cold water inlet manifold.

In some implementations of the fifth aspect of the disclosure, the water treatment system is a water softener.

In some implementations of the fifth aspect of the disclosure, the water heating system further comprises a treated cold water outlet fluidically coupled to receive treated cold water from the water treatment system at a first junction. The recirculation pump is in fluid communication with the cold water inlet manifold at a second junction. the water heating system further comprises a check valve positioned between the first junction and the second junction.

In some implementations of the fifth aspect of the disclosure, the water heating system further comprises a second check valve positioned between the recirculation pump and the second junction.

In some implementations of the fifth aspect of the disclosure, the water heating system further comprises a first shut-off valve and a second shut-off valve. The first shut-off valve is positioned between the untreated cold water inlet and the treatment inlet of the water treatment system. The second shut-off valve is positioned between the treatment outlet of the water treatment system and the first junction.

In some implementations of the fifth aspect of the disclosure, the water heating system further comprises a third junction positioned between the untreated cold water inlet and the first shut-off valve. The water heating system further comprises a bypass shut-off valve positioned between the third junction and the first junction.

In some implementations of the fifth aspect of the disclosure, the water heating system further comprises a fourth junction positioned between the bypass shut-off valve, the second shut-off valve, and the first junction.

In some implementations of the fifth aspect of the disclosure, the cold water inlet manifold and the hot water outlet manifold are arranged to extend in the height direction.

In some implementations of the fifth aspect of the disclosure, the cold water inlet manifold and the hot water outlet manifold are coupled to the support of the rack.

In some implementations of the fifth aspect of the disclosure, the cold water inlet manifold and the hot water outlet manifold are coupled to the support of the rack via a slotted strut channel and a crush clamp, a clamp, or a bracket.

In some implementations of the fifth aspect of the disclosure, the first top surface comprises a bifurcated air intake and exhaust vent for the first water heater. The water heating system further comprises an air intake manifold fluidically coupled to the air intake for the first water heater and the air intake for the second water heater. The water heating system further comprises an exhaust manifold fluidically coupled to the exhaust vent for the first water heater and the exhaust vent for the second water heater.

In some implementations of the fifth aspect of the disclosure, the rack has a width that is smaller than a width of the storage tank.

In some implementations of the fifth aspect of the disclosure, the rack and the water treatment system have a floor space of less than or equal to 8.5 square feet.

In some implementations of the fifth aspect of the disclosure, the water heating system further comprises a third water heater coupled to the support of the rack. The third water heater comprising a side surface that faces in a side surface of the first water heater or the second water heater.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
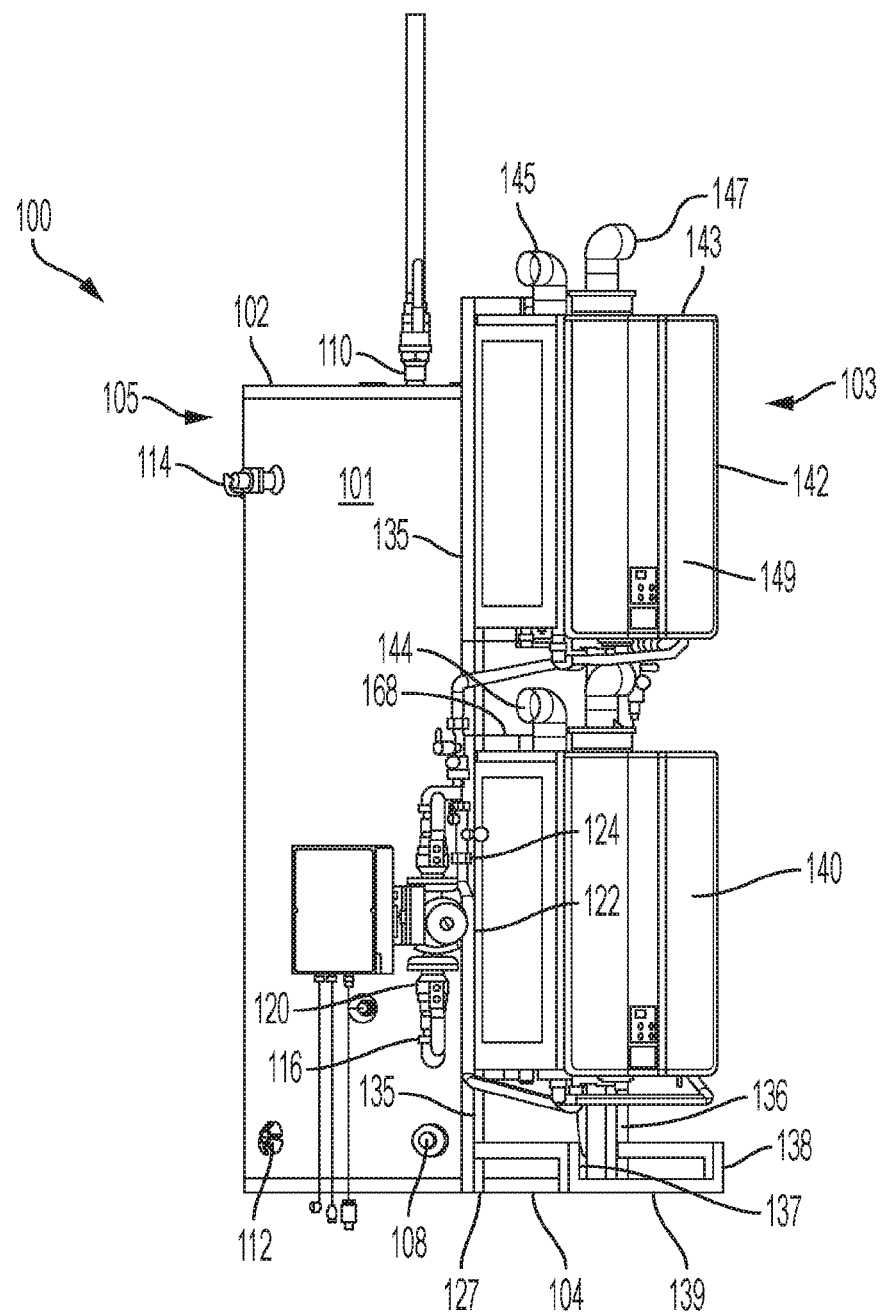
FIG. 1 illustrates a hot water heater rack system connected to a hot water storage system suitable for implementing the several embodiments of the disclosure.
Figure 2:
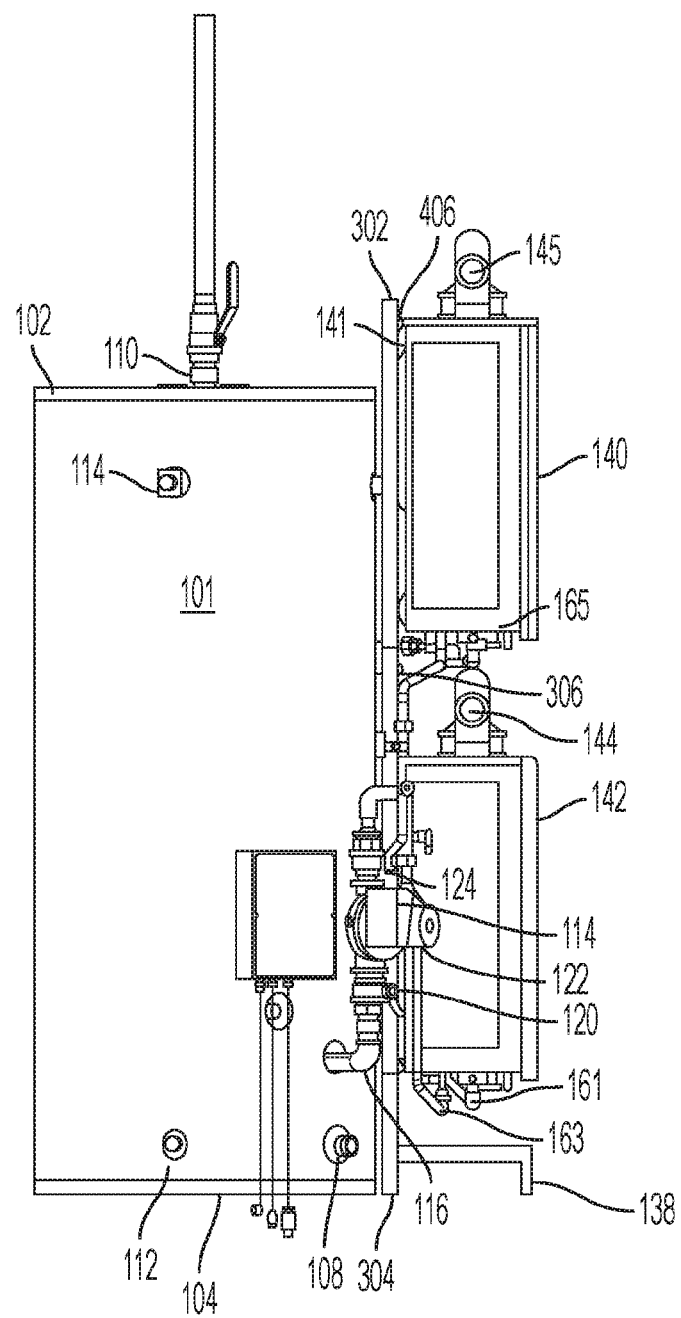
FIG. 2 illustrates a side view of the hot water heater rack system of FIG. 1.
Figure 3:
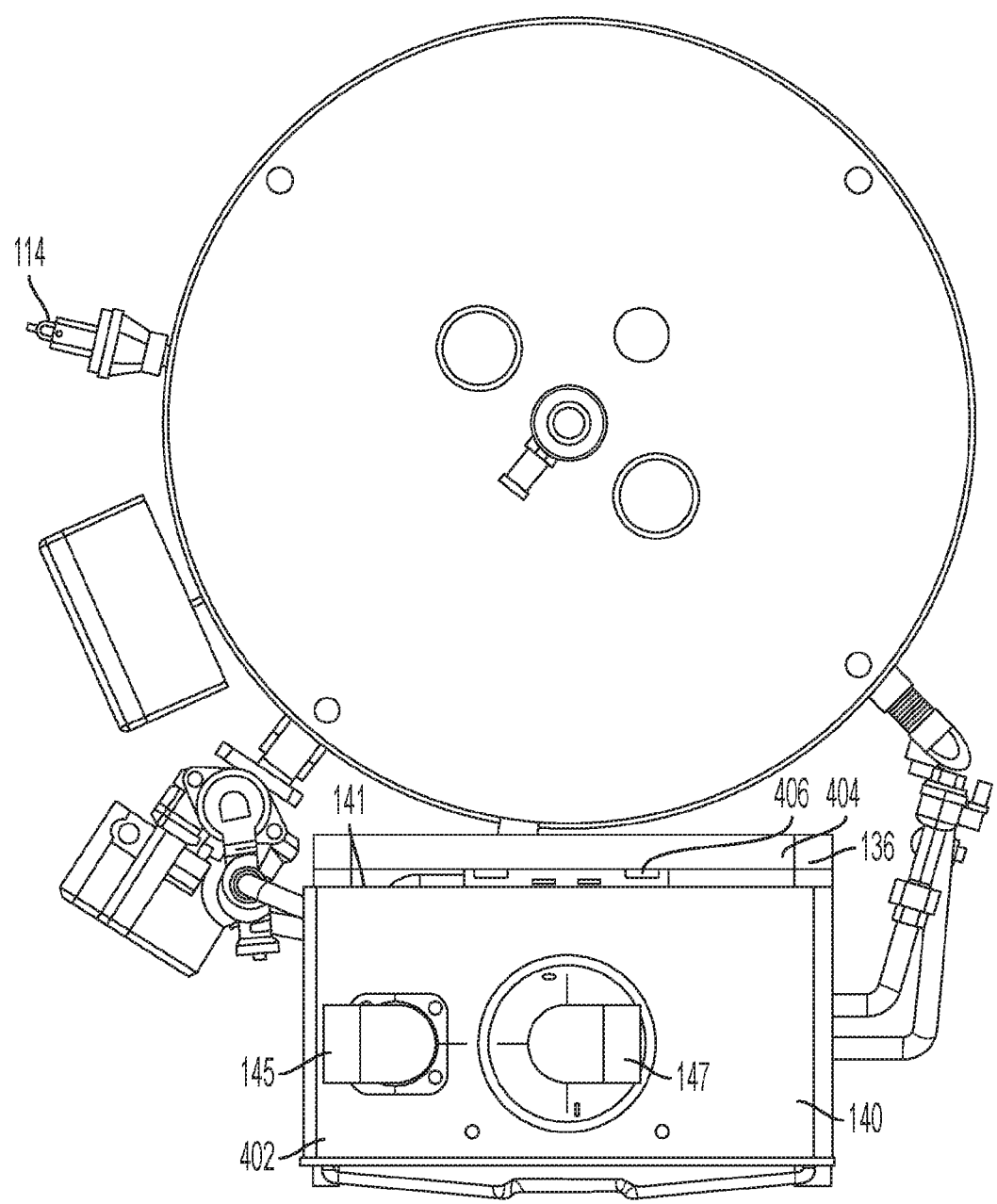
FIG. 3 illustrates a top view of the hot water heater rack system of FIG. 1.
Figure 4:
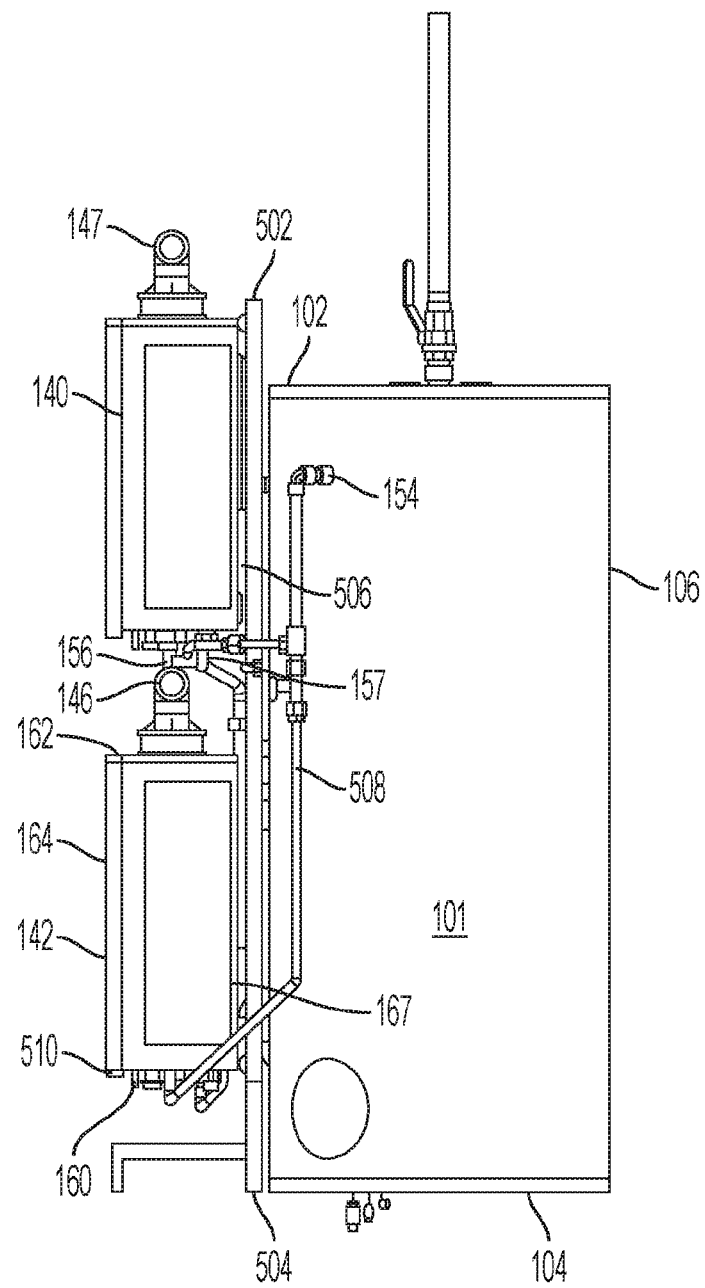
FIG. 4 illustrates a side view of the hot water heater rack system of FIG. 1.

It should be understood at the outset that although illustrative implementations of one or more embodiments are illustrated below, the disclosed systems and methods may be implemented using any number of techniques, whether currently known or in existence. Like numbers represent like parts throughout the various figures, the description of which is not repeated for each figure. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

Water heater systems that comprise a water heater rack system with a plurality of vertically stacked tankless water heaters and a water heater storage tank provide the ability to install a water heater in environments where horizontally oriented heater rack systems would not fit, such as small rooms or cluttered industrial spaces. Additionally, when the tankless water heaters utilize a bifurcated vent arrangement, intake and exhaust functions can be executed in independent environments. For example, the intake air may be obtained from a local or otherwise ideal environment, while exhaust gas is expelled in a remote or otherwise ideal environment. Using a bifurcated vent arrangement allows for the vent pipes to be smaller than an integrated vent system with coaxial intake and exhaust paths. For example, a coaxial intake and exhaust vent pipe may have a diameter of three or more inches, whereas the bifurcated vent pipes may have a diameter of two inches or less. Accordingly, the smaller vent diameter allows a plurality of water heaters to be stacked, one above the other in a compact vertical arrangement.

FIG. 1-5 illustrate a water heating and storage system 100 suitable for implementing the several embodiments of the disclosure. The water heating and storage system 100 includes a water heater rack system 103, and a hot water storage system 105. The hot water storage system 105 includes a storage tank 101 with a top surface 102, a base or bottom surface 104, and a sidewall 106 that extends between the top surface 102 and the bottom surface 104. The bottom surface 104 is a surface upon which the storage tank 101 rests on a substrate or floor in use. The top surface 102 is a surface on an opposing end of the storage tank 101 as the bottom surface 104.

The storage tank 101 encloses a volume for storage of water or other fluids therein. The enclosed storage volume is greater than comparably sized hot water systems with integrated heating elements due to not requiring space for accommodating heating elements or a flu. For example, with a 119-gallon storage tank, all 119 gallons may be utilized for storage of water therein.

The storage tank 101 includes a cold-water inlet 108 positioned on the sidewall 106 adjacent to the bottom surface 104 and a hot water outlet 110 positioned on the top surface 102. In use, the cold-water inlet 108 is coupled to a municipal water supply or other water supply for supplying cold water to the storage volume of the storage tank 101. The storage tank 101 also includes a drain 112 positioned on the sidewall 106 adjacent to the bottom surface 104 at about the same distance from the bottom surface 104 as the cold-water inlet 108. The drain 112 includes a drain plug (not shown) or other access port for draining water from the storage volume of the storage tank 101. In other words, the cold-water inlet 108 is positioned at the same distance between the top surface 102 and the bottom surface 104 as the drain 112. The storage tank 101 also includes a pressure relief valve 114 configured to relieve overpressure from within the storage tank 101. The storage tank 101 also includes one or more sacrificial anodes 138.

Figure 5:
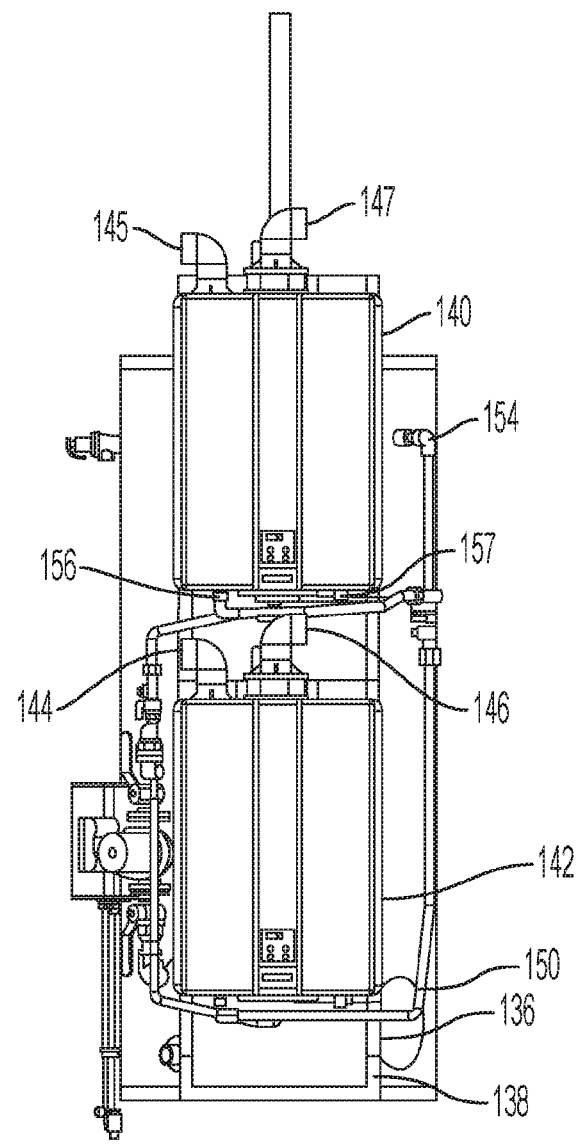
FIG. 5 illustrates a front view of the hot water heater rack system of FIG. 1.

The hot water storage system 105 includes a recirculation loop with a tank recirculation outlet 116 positioned on the sidewall 106 above the cold-water inlet 108. The recirculation loop also includes a tank recirculation inlet 154, as shown in FIG. 5, positioned on the sidewall 106 above the tank recirculation outlet 116 towards the top surface 102. The tank recirculation inlet 154 is positioned on the sidewall 106 at about the same distance from the top surface 102 as the pressure relieve valve. The tank recirculation inlet 154 is closer to the top surface 102 than to the tank recirculation outlet 116. As discussed in more detail below, the tank recirculation inlet 154 is configured to receive hot water from an external water heating engine system. Because the hot water storage system 105 is configured to receive hot water from an external system, various implementations of the hot water storage system 105 do not include a heating element.

By positioning the tank recirculation outlet 116 and inlet 154 far apart from each other on the sidewall 106, temperature stratification between cold water on a bottom of the tank 101 and hot water stored within the tank 101 is improved. Accordingly, a usable volume of hot water stored within the tank is approximately 90% of the storage volume of the tank 101. Following the example above of a 119-gallon storage tank 101, this provides for a usable hot water storage volume of approximately 107 gallons. The usable hot water storage volume is a volume of hot water stored within the storage tank 101 within a threshold temperature difference of the set point. In some implementations, the threshold temperature difference is within 20° F. of the set point. Other threshold temperature difference values may be used and may be defined as a relative amount with respect to the set point. For example, the threshold temperature difference may be within 15% of the temperature of the set point.

The recirculation loop of the hot water storage system 105 also includes an inlet isolation valve 120, a recirculation pump 122, an outlet isolation valve 124, and a storage system recirculation outlet 126. The tank recirculation outlet 116 is fluidically coupled to a pump inlet of the recirculation pump 122 via the inlet isolation valve 120. One or more lengths of pipe may fluidically connect the tank recirculation outlet 116 to the inlet isolation valve 120. In the example shown in FIG. 1, the recirculation pump 122 is oriented with the pump inlet facing in a direction towards a plane parallel to and coincident with a plane of the bottom surface 104. Likewise, a pump outlet of the recirculation pump 122 faces in a direction towards a plane parallel to and coincident with a plane of the top surface 102. Other orientations of the recirculation pump 122 are contemplated, such as at an orientation perpendicular to that shown in FIG. 1 or at any angle therebetween.

The pump outlet of the recirculation pump 122 is fluidically coupled to the storage tank 101 recirculation outlet 126 via the outlet isolation valve 124. The outlet isolation valve 124 is configurable between an open and closed position. In the closed position, the outlet isolation valve 124 is configured to fluidically isolate the pump outlet of the recirculation pump 122 from the storage system recirculation outlet 126. In the open position of the outlet isolation valve 124, the pump outlet of the recirculation pump 122 is in fluid communication with the storage tank 101 recirculation outlet 126.

The water heater rack system 103 comprises a rack frame for vertically mounting two heat engines, such as tankless water heaters. By orienting the heat engines vertically on the rack (e.g., one on top of the other), the water heater rack system 103 is able to supply a high capacity flow of hot water with redundant systems. Additionally, by using heat engines with a bifurcated vent system (e.g., separate intake and exhaust vents), smaller diameter vent pipes may be used. Accordingly, when vertically mounted on the rack frame, the heat engines are able to be located closer together, thereby minimizing the total vertical height of the water heater rack system 103. In various implementations, the water heater rack system 103 has a maximum height of 80 inches or less. In some implementations, the water heater rack system 103 has a maximum height of 76 inches or less. By minimizing the vertical height of the water heater rack system 103, the water heater rack system 103 is able to easily pass through standard doorways for installation.

The water heater rack system 103 includes a first post 135 having a first end 302 and a second end 304. The second end 304 of the first post 135 comprises a first support surface. The water heater rack system 103 also includes a second post 136 having a first end 502 and a second end 504. The second end 504 of the second post 136 comprises a second support surface. The first and second support surfaces are coplanar. The first support surface and the second support surface are each respectively a surface on the end of the first post 135 and the second post 136 that provide structural support against a surface in a direction opposite the first ends of the first post 135 and the second post 136, respectively. In applications that include a water heater storage tank, the first support surface and the second support surface may be coplanar with the bottom surface 104 of the storage tank 101. Accordingly, the bottom surface 104 of the storage tank 101 may rest on a planar surface and the first support surface on the second end 304 of the first post 135 and second support surface on the second end 504 of the second post 136 may stably rest on the same planar surface. Accordingly, the first post 135 and the second post 136 are parallel with a longitudinal axis of the storage tank 101.

The water heater rack system 103 includes a first support 137 having a first end that rigidly connects to the first post 135 at a point on the first post 135 between the first end 302 and the second end 304 of the first post 135. The first support is situated on an outer surface 306 of the first post 135. A second end of the first support 137 is coplanar with the second end of the first post 304 and set apart a distance from the first post 135 in a direction away from the storage tank 101.

Additionally, the water heater rack system 103 includes a second support 138 that rigidly connects to the second post 136 at a point on the second post 136 between the first end 502 and the second end 504 of the second post 136. The second support is situated on an outer surface 506 of the second post 136. A second end of the second support 138 is coplanar with the second end 504 of the second post 136 and set apart a distance from the first post 135 in a direction away from the storage tank 101 and away from the outer surfaces 306, 506 of the first and second posts 135, 136. In embodiments, the water heater rack system also includes a linking bar 139 that connects to the second end of the first support 137 and the second end of the second support 138. The first and second supports 137, 138 act as a support structure to stabilize the water heater rack system 103 by preventing the first and second posts 135, 136 from rotating in a direction towards the first and second supports 137, 138 (e.g., tipping over) when heat engines are mounted to the first and second posts 135, 136, as described below.

A first heat engine 140 having a first (e.g., back) surface 141 (best shown in FIG. 4) coupled across the first post 135 and the second post 136. The first heat engine 140 is located at a first location between the first and second ends 302, 304 of the first post 135 and the first and second ends 502, 504 of the second post 136. The first surface 141 is parallel to the outer surfaces 306, 506 of the first and second posts 135, 136. A cross bar 404 (best seen in FIG. 4) is rigidly affixed between the first ends 302, 502 of the first and second posts 135, 136. A bracket 406 affixes the first heat engine 140 to the cross bar 404.

The first heat engine 140 also has a second (e.g., bottom) surface 165 that is perpendicular to the first surface 141 of the first heat engine. The second surface 165 of the first heat engine 140 has a first hot water outlet 156 and a first cold water inlet 157. The first hot water outlet 156 and the first cold water inlet 157 face in a direction towards the first and second support surfaces on the second ends 304, 504 of the first and second posts 135, 136. The first heat engine 140 also has a third (e.g., top) surface 143 opposite the second surface 165 of the first heat engine 140. An intake vent pipe 145 and an exhaust vent pipe 147 are located on the third surface 143 of the first heat engine 140. In some implementations, the intake and exhaust vent pipes 145, 147 have a diameter of two (2) inches or less.

The first heat engine 140 also has a fourth (e.g., front) surface 149 that is perpendicular to the second and third surfaces 165, 143 and opposite from the first surface 141. In various implementations, the first and second supports 137, 138 are spaced apart from the first and second posts 135, 136 in a direction towards the fourth surface 149, but do not extend beyond the fourth surface 149.

A second heat engine 142 has a first (e.g., back) surface 167 coupled across the first and second posts 135, 136 at a second location between the first and second end 302, 304 of the first post 135 and the first and second ends 502, 504 of the second post 136. The second location is closer to the second ends 304, 504 of the first and second posts 135, 136 than the first location. The first surface 167 is parallel to the outer surfaces 306, 506 of the first and second posts 135, 136. A cross bar 168 is rigidly affixed between the first and second posts 135, 136 at the second location. A bracket (not shown) affixes the second heat engine 142 to the cross bar 168.

The second heat engine also has a second (e.g., bottom) surface 160 that is perpendicular to the first surface 167 of the second heat engine 142. The second surface 160 of the second heat engine 142 has a second hot water outlet 161 and a second cold water inlet 163. The second hot water outlet 161 and the second cold water inlet 163 face towards the first and second support surfaces on the second ends 304, 504 of the first and second posts 135,136. The second heat engine 142 also has a third (e.g., top) surface 162 opposite the second surface 160 of the second heat engine 142. An intake vent pipe 144 and an exhaust vent pipe 146 are located on the third surface 162 of the second heat engine 142. In some implementations, the intake and exhaust vent pipes 144, 146 have a diameter of two (2) inches or less. The third surface 162 of the second heat engine 142 faces towards the second surface 165 of the first heat engine 140.

The second heat engine 142 also has a fourth (e.g., front) surface 164 that is perpendicular to the second and third surfaces 160, 162 and opposite from the first surface 167. In various implementations, the first and second supports 137, 138 are spaced apart from the first and second posts 135, 136 in a direction towards the fourth surface 149, but do not extend beyond the fourth surface 164. The fourth surface 164 of the second heat engine 142 is parallel and coplanar with the fourth surface 149 of the first heat engine 140.

The first cold water inlet 157 and the second cold water inlet 163 are fluidically coupled to a cold water inlet manifold 170. The cold water inlet manifold 170 receives cold water supplied by the recirculation pump 122 and supplies the cold water to the first and second cold water inlets 157, 163 of the first and second heat engines 140, 142.

The first hot water outlet 156 and the second hot water outlet 161 are fluidically coupled to a hot water outlet manifold 172. The hot water outlet manifold 172 receives hot water produced by the first and second heat engines 140, 142 and supplies the hot water to the tank recirculation inlet 154. In some implementations, the cold water inlet manifold 170 and the hot water outlet manifold 172 may be secured to the water heater rack system 103 via one or more clamps, brackets, or other fixtures.

Providing bifurcated intake and exhaust vent pipes 144, 146 that have a diameter of two (2) inches or allows a plurality of heat engines to be stacked vertically while still keeping a maximum height of the water heater rack system 103 to under 80 inches. In some implementations, the height of the water heater rack system 103 is 76 inches or less. In some implementations, the water heater rack system 103 with the vertically stacked first and second heat engines 140, 142 may be arranged flush with the water storage tank 101, thereby taking up minimal floor space.

Figure 6:
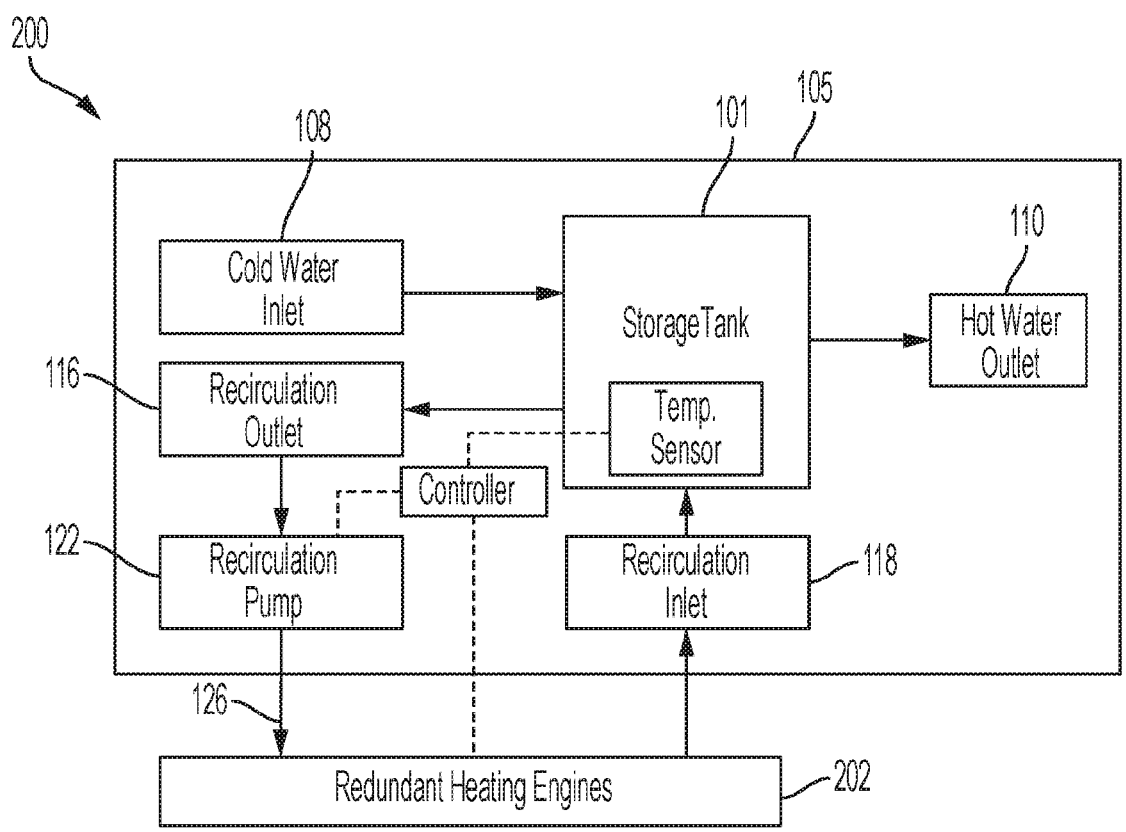
FIG. 6 illustrates a hot water supply system comprising the hot water heater rack system of FIGS. 1-5.

FIG. 6 illustrates a hot water supply system 200 that comprises the hot water storage system 105 and an external water heating engine system 202. The external water heating engine system 202 comprises a plurality of heating engines, such as the first and second heat engines 140, 142 of the water heater rack system 103 as illustrated in FIG. 1. As hot water storage volume is provided by the storage tank 101, the plurality of heating engines are implemented as tankless water heaters. Throughout this disclosure, tankless, demand-type, on-demand, or instantaneous water heaters are used synonymously with each other and refer to systems that heat water as the water flows through the water heater. While some amount of volume or storage of water may be present on such systems, the size of such storage may be limited to about one gallon of water or less. Additionally, these water heaters typically do not maintain the temperature of water within the water heater when not in use. Each of the tankless water heaters have an input of less than 200,000 BTU/hr. In some implementations, the tankless water heaters may have an input of greater than 190,000 BTU/hr.

Providing a plurality of heating engines in the external water heating engine system 202 enables the hot water supply system 200 to be scaled and sized to meet a variety of different capacity requirements for supplying hot water. Each of the plurality of heating engines may be an independent system with its own controller for supplying hot water at a set point temperature. In some implementations, the controllers of the heating engines may be chained together (e.g., master-slave, etc.) or otherwise communicate with one another to allow for adjustment of the set point temperature on any of the heating engines. By providing multiple independent heating engines, the hot water supply system is provided with redundancy to continue supplying hot water even if one or more of the heating engines fails or otherwise requires maintenance.

Figure 7:
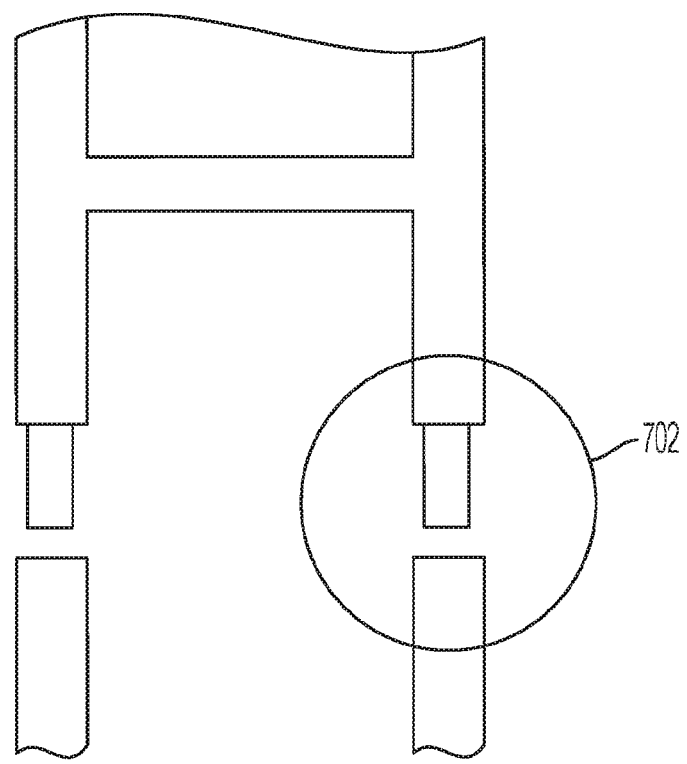
FIG. 7 illustrates a connection point for separable sections of the hot water heater rack system suitable for implementing the several embodiments of the disclosure.

FIG. 7 illustrates a connection 702 between separable portions of the water heater rack system 103. In embodiments, the water heater rack system may be separated in to discrete portions and re-connected. Separation and reconnection allows water heaters to be modularly stacked and interchanged with minimal assembly and disassembly effort. For example, the connection 702 may be located on the first and second posts 135, 136 between the first and second locations so that the first and second heat engines 140, 142 are connected to separable portions of the water heater rack system 103. This allows individual heat engine units to be replaced, maintained, and arranged frequently, optimizing performance and customizability for specific service needs.

Figure 8:
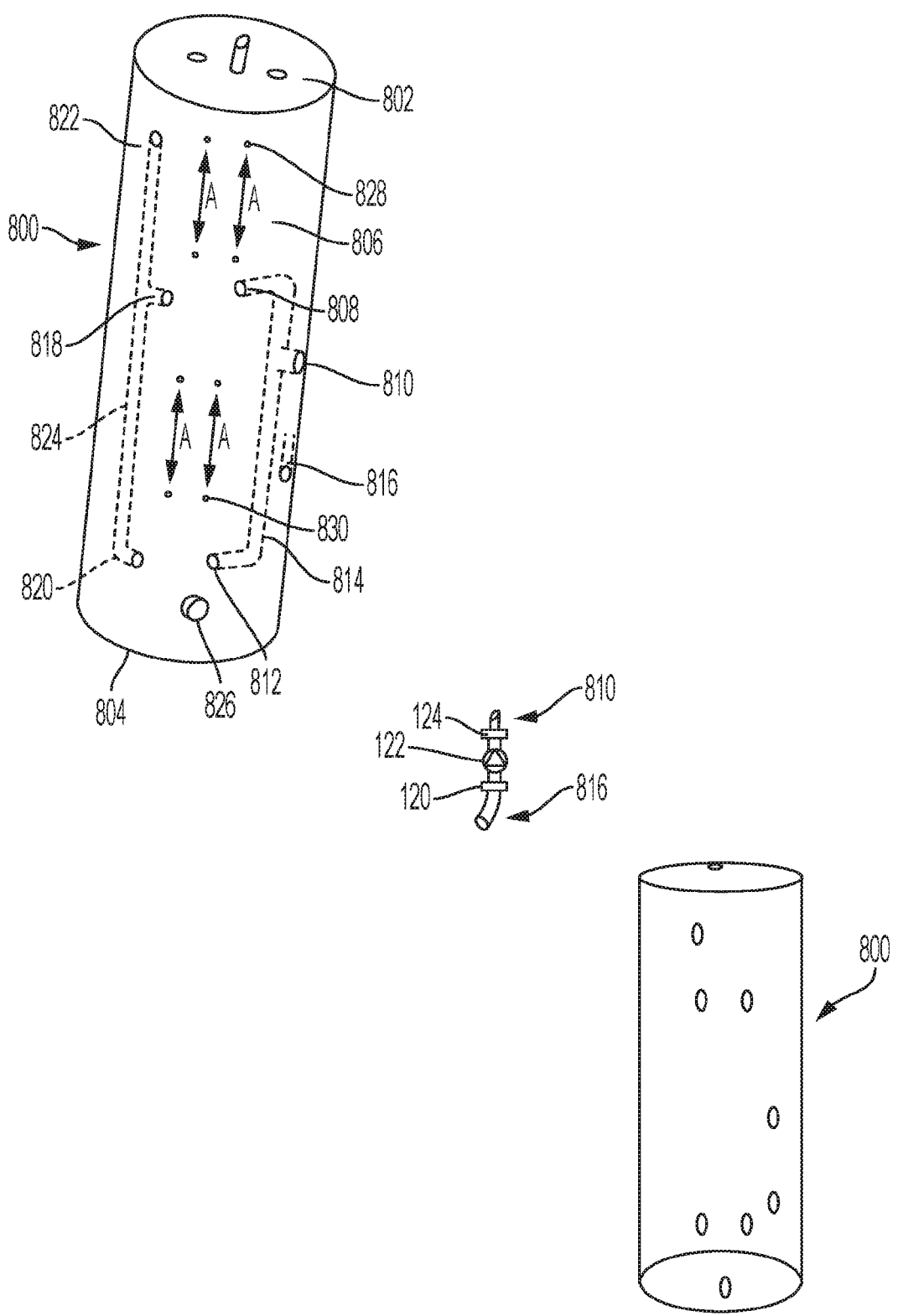
FIG. 8 illustrates a water heater storage tank containing an insulated hot water manifold within the insulation layer of the tank structure suitable for implementing the several embodiments of the disclosure.

FIG. 8 illustrates an embodiment of a water heater storage tank 800 that contains an insulated internal manifold for hot water circulation. The water heater storage tank 800 may be used in conjunction with a plurality of heat engines as a water heater and storage tank system. The water heater storage tank 800 comprises a top surface 802, a bottom surface 804, an inner sidewall (not shown) that extends between the top surface and the bottom surface and encloses an inner volume for storage of hot water or other fluids therein. The water heater storage tank 800 also comprises an outer sidewall 806 that extends between the top surface 802 and the bottom surface 804 and encloses an outer volume between the inner sidewall and the outer sidewall 806. The outer sidewall 806 may be coaxial with the inner sidewall. The outer volume may be filled with insulation material to insulate the inner volume and hot water stored inside the water heater storage tank 800. The outer sidewall of the water heater storage tank has an inner surface that faces towards the inner sidewall and an outer surface that faces exterior to the water heater storage tank 800.

A cold-water inlet port 810 extends from the outer volume beyond the outer surface of the outer sidewall. A first cold-water outlet port 808 extends from the outer volume beyond the outer surface of the outer sidewall 806. A second cold-water outlet port 812 extends from the outer volume beyond the outer surface of the outer sidewall 806. A cold-water manifold 814 is positioned within the outer volume, as indicated by the dashed lines, and is fluidically connected to each of the cold-water inlet port 810, the first cold-water outlet port 808, and the second cold-water outlet port 812.

A cold-water recirculation port 816 extends from the inner volume beyond the outer surface of the outer sidewall 806. The inlet isolation valve 120, recirculation pump 122, and outlet isolation valve 124 may be coupled between the cold-water recirculation port 816 and the cold-water inlet port 810. In operation, the recirculation pump 122 draws cold water from the inner volume through the cold-water recirculation port 816. The recirculation pump 122 supplies the drawn cold water to the cold-water inlet port 810, through the cold-water manifold 814 and out of the first and second cold-water outlet ports 808, 812. Each of the first and second cold-water outlet ports 808, 812 extend from the outer sidewall 806 at a location proximate to where a cold-water inlet port is located upon installation of heat engines. For example, the first cold-water outlet port 808 may be located proximate to the first cold water inlet 157 of the first heat engine 140 upon installation of the first heat engine 140 on the water heater storage tank 800. Likewise, the second cold-water outlet port 812 may be located proximate to the second cold water inlet 163 of the second heat engine 142 upon installation of the second heat engine 142 on the water heater storage tank 800.

In some implementations, the cold-water manifold 814 may be located closer to the inner surface of the outer sidewall 806 than to the inner sidewall. The cold-water manifold 814 may touch the inner surface of the outer sidewall 806. Accordingly, in use, the insulation material located within the outer volume will insulate the cold-water manifold 814 from the hot water contained within the inner volume. In some implementations, the cold-water manifold 814 may be located on the outer surface of the outer sidewall 806. A shroud or other container may cover the cold-water manifold 814 when it is located on the outer surface of the outer sidewall 806.

A first hot water inlet port 818 extends from the outer volume beyond the outer surface of the outer sidewall 806.

The first hot water inlet port 818 extends from the outer sidewall 806 adjacent to and at approximately the same height as the first cold-water outlet port 808. The first hot water inlet port 818 extends from the outer sidewall 806 at a location proximate to where a hot-water outlet is located upon installation of heat engines. For example, the first hot-water inlet port 818 may be located proximate to the first hot water outlet 156 of the first heat engine 140 upon installation of the first heat engine 140 on the water heater storage tank 800.

A second hot water inlet port 820 extends from the outer volume beyond the outer surface of the outer sidewall 806. The second hot water inlet port 820 extends from the outer sidewall 806 adjacent to and at approximately the same height as the second cold-water outlet port 812. The second hot water inlet port 820 extends from the outer sidewall 806 at a location proximate to where a hot-water outlet is located upon installation of heat engines. For example, the second hot-water inlet port 820 may be located proximate to the second hot water outlet 161 of the second heat engine 142 upon installation of the second heat engine 142 on the water heater storage tank 800.

A third hot water inlet port 822 extends from the inner volume to the outer volume. A hot water manifold 824 is positioned within the outer volume and fluidically connected to each of the first, second, and third hot water inlet ports 818, 820, 822. In use, the first and second hot water inlet ports 818, 820 receive hot water from respective heat engines (e.g., first and second heat engines 140, 142) and supply the received hot water to the hot water manifold 824. In turn, the hot water manifold 824 supplies the received hot water to the third hot water inlet port 822 for storage within the inner volume of the water heater storage tank 800.

In some implementations, the hot water manifold 824 may be located closer to the inner sidewall than the inner surface of the outer sidewall 806. The hot water manifold 824 may touch the inner sidewall. Accordingly, in use, the insulation material located within the outer volume will insulate the hot water manifold 824 along with the hot water contained within the inner volume.

The water heater storage tank 800 also includes a third cold water inlet port 826 that extends from the inner volume beyond the outer surface of the outer sidewall 806. The third cold water inlet port 826 is adapted to receive cold water from a municipal water source or other water source for the water heater storage tank 800. The water heater storage tank 800 allows the tubing and isolation valves to be situated inside the water heater storage tank system, which saves space and provides structural protection and insulation for the tubing.

The water heater storage tank 800 may include a plurality of mounting suds that may be used to attach a plurality of tankless water heaters to the outer surface of the outer sidewall 806. Each of the mounting studs may be affixed to the inner sidewall and extend through and beyond the outer surface of the outer sidewall 806. In embodiments the mounting studs may be threaded for attaching through a bracket on the tankless water heaters to a nut fastener. In the example shown in FIG. 8, a first set of mounting studs 828 is positioned on an upper half of the water heater storage tank 800 and a second set of mounting studs 830 is positioned on a lower half of the water heater storage tank 800. Each set of mounting studs 828, 830 is adapted to receive and affix a tankless water heater to the water heater storage tank 800. In an example, the first and second set of mounting studs 828, 830 includes four mounting studs. The first set of mounting studs 838 is positioned about the hot water manifold 824 and above first the cold-water outlet port 808 and the first hot water inlet port 818. The second set of mounting studs 830 is positioned between the hot water manifold 824 and the cold water manifold 814. Additionally, the second set of mounting studs 830 is positioned below the first the cold-water outlet port 808 and the first hot water inlet port 818 and above the second the cold-water outlet port 812 and the second hot water inlet port 820.

Figure 9:
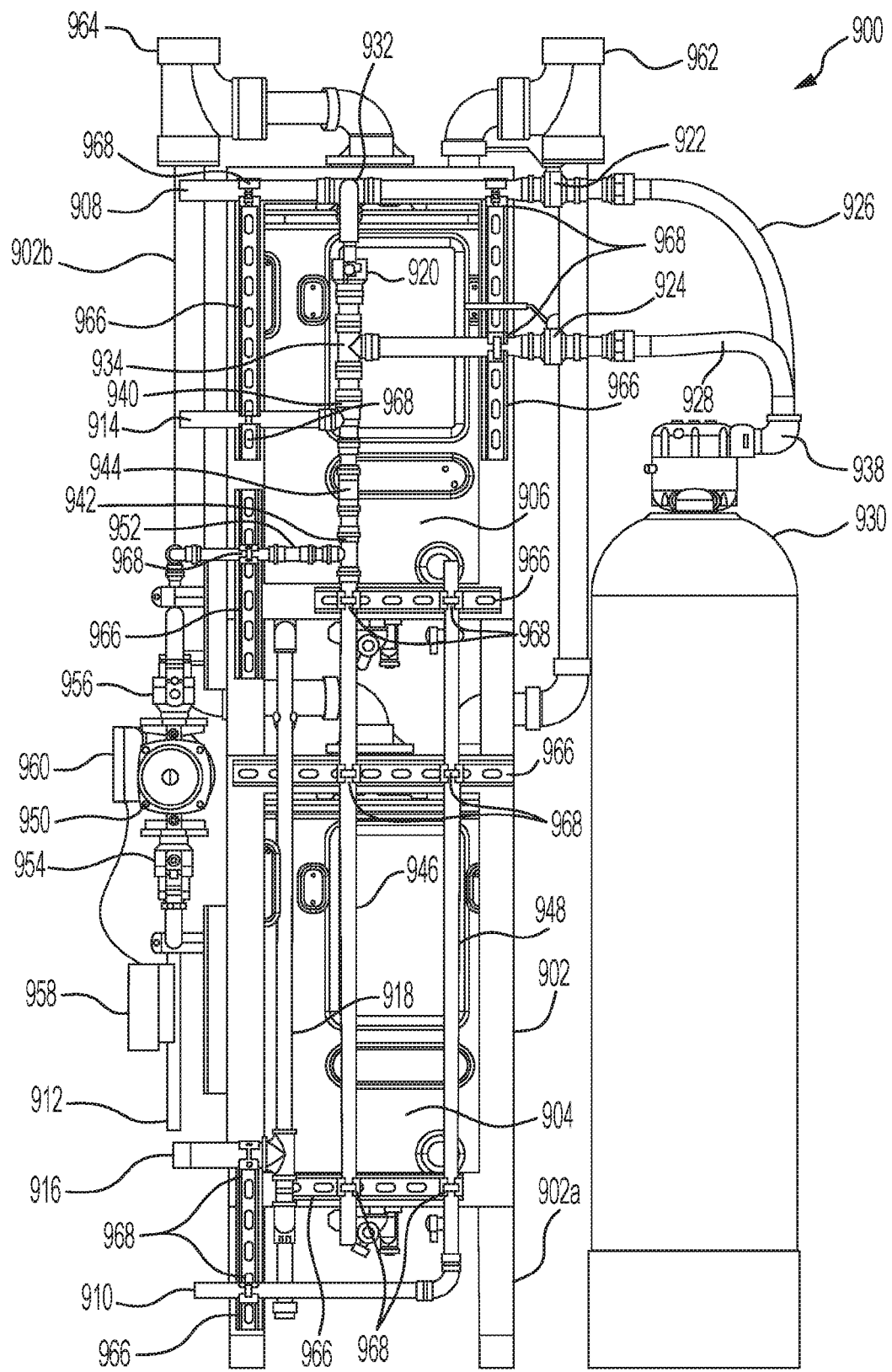
FIG. 9 illustrates a rear view of a water heating and treatment system suitable for implementing the several embodiments of the disclosure.
Figure 10:
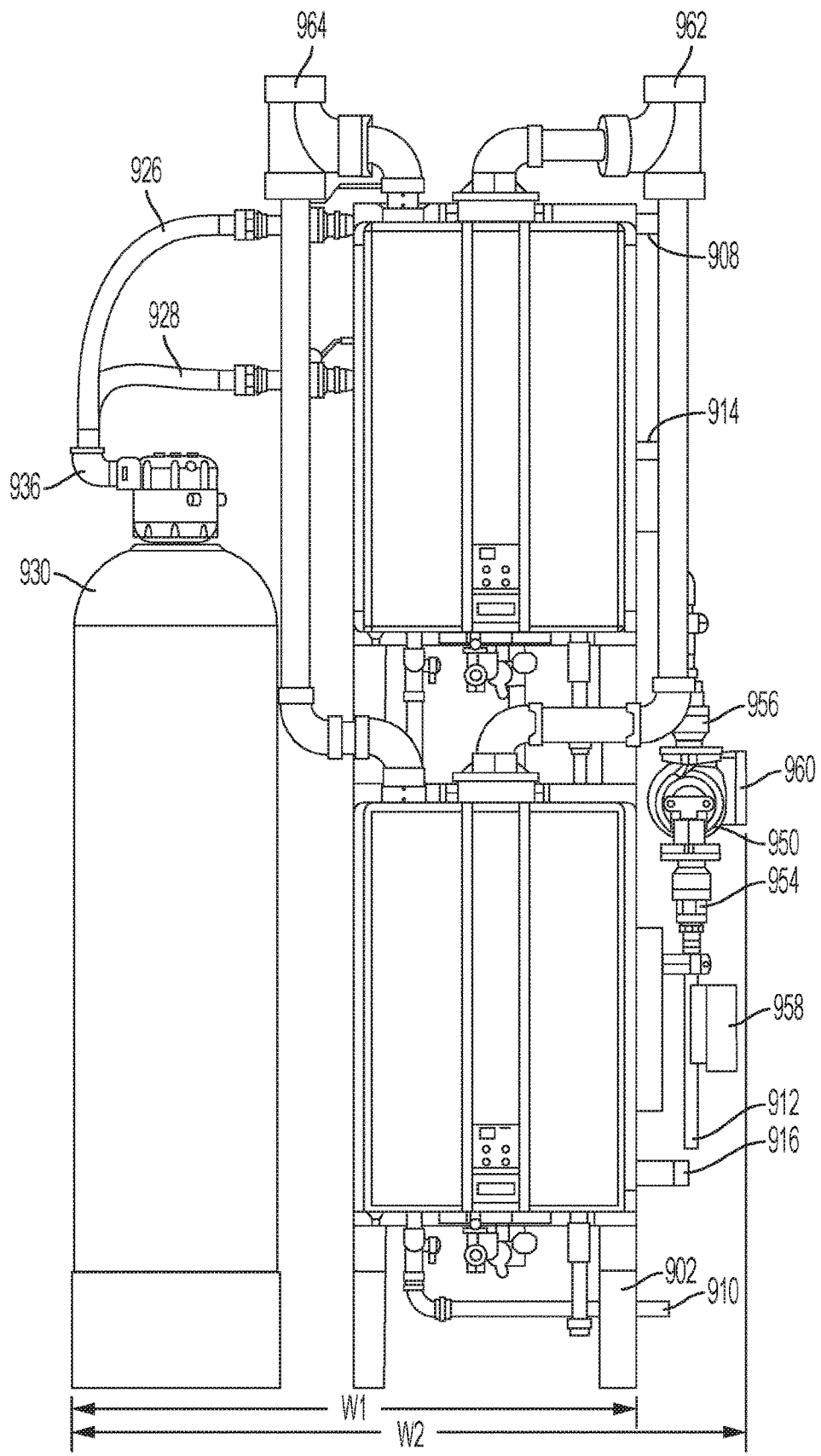
FIG. 10 illustrates a front view of the water heating and treatment system of FIG. 9.
Figure 11:
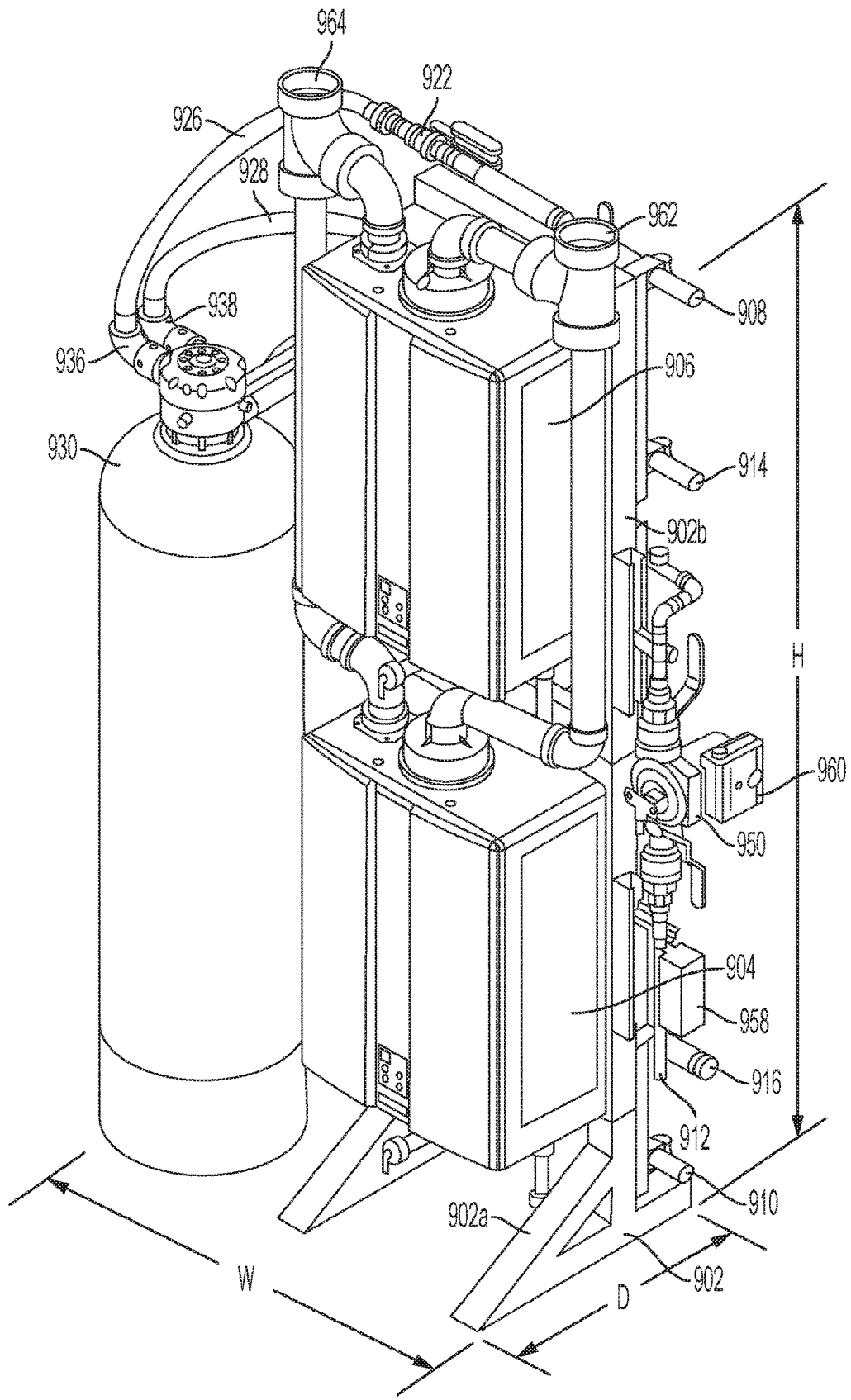
FIG. 11 illustrates a perspective view of the water heating and treatment system of FIG. 9.

FIGS. 9-11 illustrate a water heating and treatment system 900 suitable for implementing the several embodiments of the disclosure. FIG. 9 illustrates a rear view of the water heating and treatment system. FIG. 10 illustrates a front view of the water heating and treatment system. FIG. 11 illustrates a perspective view of the water heating and treatment system. As best seen in FIG. 11, the water heating and treatment system 900 has a width "W" dimension, a depth "D" dimension, and a height "H" dimension.

The water heating and treatment system 900 provides a high capacity hot water system with redundant heat engines to ensure reliable operation while treating (e.g., water softening) hot and cold water, all within the same footprint as a traditional tank-based water heater. Therefore, in locations with limited utility spaces, such as in a back room of a quick serve restaurant, the water heating and treatment system 900 provides added capability of a redundant heating engine and a water treatment system that will fit within a space occupied by a traditional hot water tank.

The water heating and treatment system 900 comprises a freestanding rack 902 configured to support mounting a first water heater 904 and a second water heater 906 in a vertical orientation (e.g., one on top of the other in a height "H" direction). Throughout the pending disclosure, "freestanding" means that the rack 902 is not supported by another structure to remain in the vertical orientation. For example, the rack 902 is not secured to a wall or other stabilizing structure to remain in the vertical orientation. In the example shown, the rack comprises a base 902a and a vertical support 902b that extends from the base 902a in a height "H" direction. A bottom surface of the base 902a is a surface upon which the rack 902 rests on a substrate or floor in use. The first and second water heaters 904, 906 are mounted at distinct locations along the vertical support 902b. A rear surface of the first and second water heaters 904, 906 mounts to the rack 902. By providing the rack 902 as a freestanding structure, dedicated wall space at an installation location is not needed. The water and gas lines described as part of the water heating and treatment system 900 are secured to the rack 902 with slotted strut channel 966 and crush clamps 968. Other clamps or other mechanisms for securing the water and gas lines to the rack 902 are contemplated by this disclosure.

Each of the first and second water heaters 904, 906 comprise a fuel inlet (e.g., natural gas or propane inlet), a cold water inlet, and a hot water outlet arranged on a bottom surface. The first and second water heaters 904, 906 also each comprise an air intake and an exhaust vent arranged on a top surface. When mounted on the rack 902, the top surface of the first water heater 904 faces the bottom surface of the second water heater 906. A front and back surface of the first water heater 904 are parallel to a front and back surface of the second water heater 906. A width of the first and second water heaters 904, 906 is less than or equal to a width of the rack 902.

Fuel from the fuel inlet and air from the air intake is supplied to a burner which is in thermal communication with a heat exchanger. Exhaust gasses from the burner are supplied to the exhaust vent. The water heating and treatment system 900 comprises an air intake manifold 962 coupled to the air intake of the first and second water heaters 904, 906. The water heating and treatment system 900 comprises an exhaust manifold 964 coupled to the exhaust vents of the first and second water heaters 904, 906. The air intake manifold 962 and/or the exhaust manifold 964 are configured to be coupled to a building premises air intake line or exhaust vent, respectively. In some implementations, the air intake manifold 962 and the exhaust manifold 964 are PVC with a 2" opening. Cold water supplied to the cold water inlet of the first and second water heaters 904, 906 flows through the heat exchanger to produce hot water of a desired temperature. The produced hot water is supplied from the hot water outlet of the first and second water heaters 904, 906.

The water heating and treatment system 900 comprises a cold water inlet 908 for receiving cold water from a cold water supply source (e.g., a municipal water supply). The water heating and treatment system 900 also comprises a hot water outlet 910 for supplying hot water to a building premises hot water supply line (not shown). In some implementations, the hot water outlet 910 may connect to the building premises hot water supply line via a hot water storage tank. The water heating and treatment system 900 also comprises a hot water recirculation line 912 for receiving water from a hot water recirculation loop (not shown) in the building premises. The water heating and treatment system 900 also comprises a cold water outlet 914 for supplying cold water to a building premises cold water supply line (not shown). The water heating and treatment system 900 also comprises a fuel inlet 916 for receiving fuel from a fuel source (e.g., propane tank or municipal natural gas supply). The fuel from the fuel inlet 916 is supplied to the fuel inlet of the first and second water heaters 904, 906 via a fuel manifold 918.

Cold water to be treated passes from the cold water inlet 908 through a first bypass junction 932 and through a first shut-off valve 922 to a water treatment supply line 926 to supply untreated cold water to a water treatment system 930. In some implementations, the water treatment system 930 is a water softener, such as a Kinetico CP210 water softener. By using the Kinetico CP210 water softener, no additional electrical outlet connections are needed. Other water treatment systems are contemplated by this disclosure. Treated water is supplied from the water treatment system 930 through a water treatment outlet line 928 through a second shut-off valve 924 to a second bypass junction 934. When the water treatment system 930 is in use, the first and second shut-off valves 922, 924 are open to permit cold water to flow through the water treatment supply and outlet lines 926, 928.

A bypass shut-off valve 920 is arranged between the first and second bypass junctions 932, 934. During operation of the water treatment system 930, the bypass shut-off valve 920 is closed to ensure that cold water supplied from the cold water inlet 908 is treated by the water treatment system 930. During installation or maintenance of the water treatment system 930, the first and second shut-off valves 922, 924 are closed to prevent water from being supplied to the water treatment system 930. At the same time, the bypass shut-off valve 920 is opened to allow for water supplied from the cold water inlet 908 to bypass the water treatment system 930 and be directly supplied to the second bypass junction 934. Therefore, the bypass shut-off valve 920 is configured in an opposite configurations (e.g., on or off) as the first and second shut-off valves 922, 924 for selectively isolating the water treatment system 930. Each of the first, second, and bypass shut-off valves, 922, 924, 920 are illustrated as ball valves, though any suitable shut-off valve may be used, such as a gate valve or any other type of shut-off valve.

In the example shown, the water treatment supply line 926 is coupled to an inlet of the water treatment system 930 via an elbow 936. Likewise, the water treatment outlet line 928 is coupled to an outlet of the water treatment system 930 via an elbow 938. The elbows 936, 938 facilitate placement of the water treatment system 930 close to the rack 902 so as to minimize a width "W" of the water heating and treatment system 900 while maintaining a desirable radius of curvature for the water treatment supply and outlet lines 926, 928. In the example shown, the radius of curvature for the water treatment supply and outlet lines 926, 928 is 90° or less. Using the elbows 936, 938 prevents the water treatment supply and outlet lines 926, 928 from extending beyond the water treatment system 930 so as to ensure a minimal width "W" of the water heating and treatment system 900. In some implementations, the water treatment supply and outlet lines 926, 928 are 1¼" MPT flex lines.

A cold water supply junction 940 receives cold water from the second bypass junction 934 and supplies cold water to the cold water outlet 914 and a recirculation junction 942. A check valve 944 positioned between the cold water supply junction 940 and the recirculation junction 942 is configured to only permit water to flow from the cold water supply junction 940 to the recirculation junction 940. Therefore, the check valve 944 ensures that hot water does not flow through the cold water supply lines. The recirculation junction 942 supplies water to a cold water manifold 946. The cold water manifold 946 is fluidically coupled to supply water to the cold water inlet on each of the first and second water heaters 904, 906.

The hot water outlet on each of the first and second water heaters 904, 906 is fluidically coupled to a hot water supply manifold 948, which in turn is coupled to the hot water outlet 910 for supplying hot water to a building premises hot water supply line. In the example shown, the hot water recirculation line 912 is coupled to a recirculation pump 950. The recirculation pump 950 is configured to pump water received at the hot water recirculation line 912 from the hot water recirculation loop in the building premises to the recirculation junction 942. A recirculation check valve 952 is positioned between the recirculation pump 950 and the recirculation junction 942. The recirculation check valve 952 ensures that cold water received at the recirculation junction 942 does not pass into the recirculation line 912. While the recirculation check valve 952 is shown as a separate component as the recirculation pump 950, in some implementations, the recirculation check valve 952 may be integrated into the recirculation pump 950. In some implementations, the cold water manifold 946 and the hot water supply manifold 948 are 1" press copy pipes. In some implementations, each of the air intake manifold 962, exhaust manifold 964, fuel manifold 918, cold water manifold 946, and hot water supply manifold 948 extend along the rack 902 in a height "H" direction.

A first recirculation shut-off valve 954 is positioned at an inlet of the recirculation pump 950. Likewise, a second recirculation shut-off valve 956 is positioned at an outlet of the recirculation pump 950. The first and second recirculation shut-off valves 954, 956 isolate the recirculation pump 950 when closed to facilitate installation and maintenance of the recirculation pump. An aquastat 958 is positioned on the hot water recirculation line 912 and configured to measure a temperature of water within the hot water recirculation line

912. The aquastat 958 is electrically coupled (as shown by the dotted line) to a recirculation controller 960. The recirculation controller 960 is configured to activate the recirculation pump 950 in response to the aquastat 958 sensing a temperature below a threshold temperature.

In some implementations, the water heating and treatment system 900 may not include the recirculation pump 950, the first and second recirculation shut-off valves 954,956, the aquastat 958, and/or the recirculation controller 960.

As shown in FIG. 10, the water heating and treatment system 900 has a first width dimension W1 that extends from an outside edge of the rack 902 and an outside edge of the water treatment system 930. The water heating and treatment system 900 has a second width dimension W2 that extends from an outside edge of the recirculation controller 960 and the outside edge of the water treatment system 930. In some examples, the width W1 is less than 40, 39, 38, or 37 inches. In an example, the width W1 is 36.8 inches. In some examples, the width W2 is less than 50, 49, 48, 47, 46, or 45 inches. In an example, the width W2 is 44.12 inches. By providing the water heating and treatment system 900 within the width W2, the water heating and treatment system 900 is able to provide redundant water heaters for high capacity and reliable water heating as well as a water treatment system in a floor space of a traditional tank water heater.

In some examples, the water heating and treatment system 900 has a depth dimension of less than 30 inches. In an example, the water heating and treatment system 900 has a depth dimension of 27 inches. In some examples, the water heating and treatment system 900 has a height that extends from a bottom of the base 902a to a top of the air intake manifold 962 and the exhaust manifold 964. The height of the water heating and treatment system 900 is less than 90, 89, 88, 87, or 86 inches. In an example, the height is 85.39 inches. In some examples, the water heating and treatment system 900 occupies a floor space of less than 15, 10, or 9 square feet. In an example, the water heating and treatment system 900 occupies a floor space of less than or equal to 8.5 square feet. Based on the above, it can be seen that the water heating and treatment system 900 provides for large capacity, redundant operations, hot and cold water treatment, and hot water recirculation in a small footprint.

Figure 12:
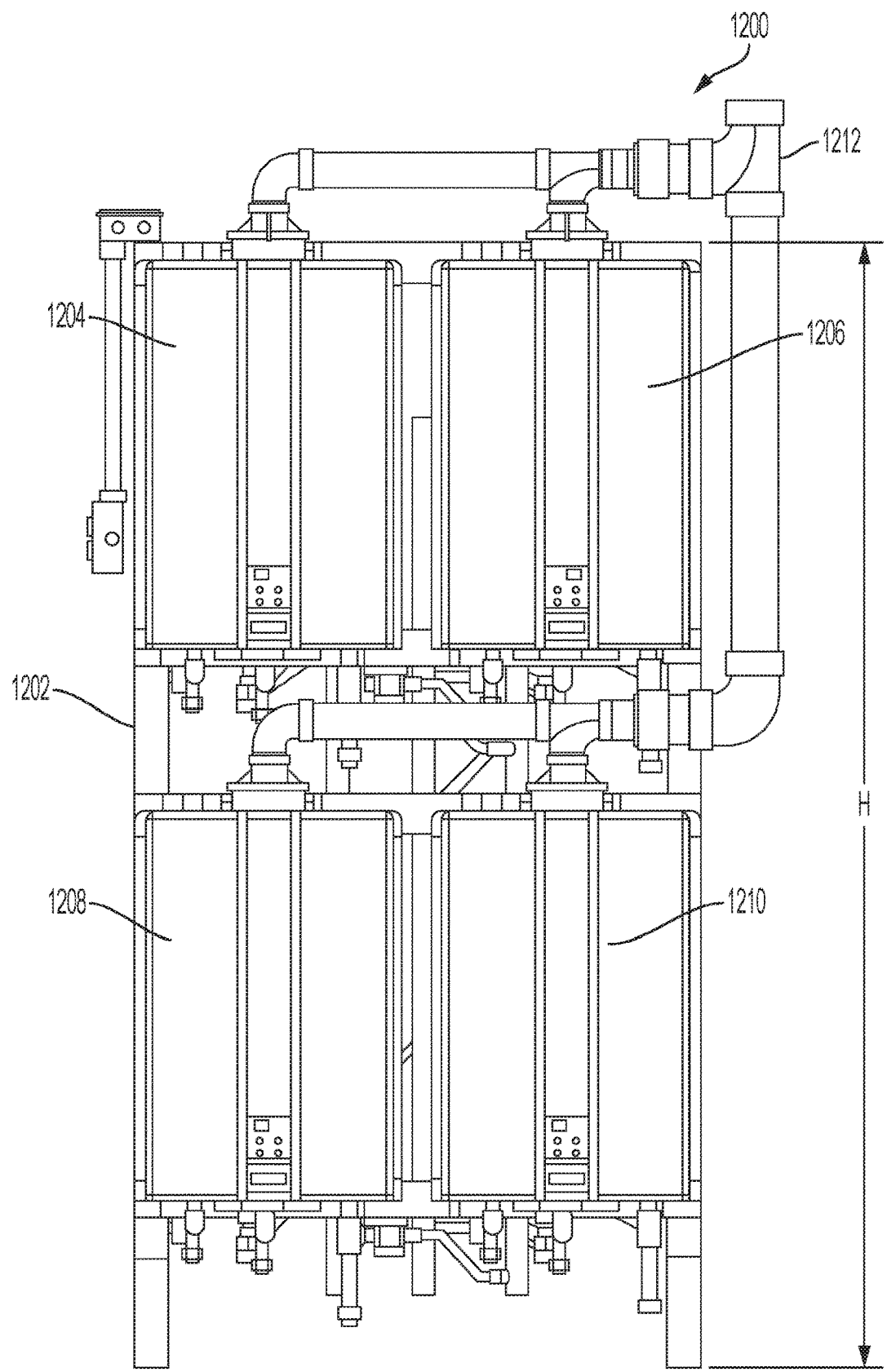
FIG. 12 illustrates a front view of a water heating system suitable for implementing the several embodiments of the disclosure.
Figure 13:
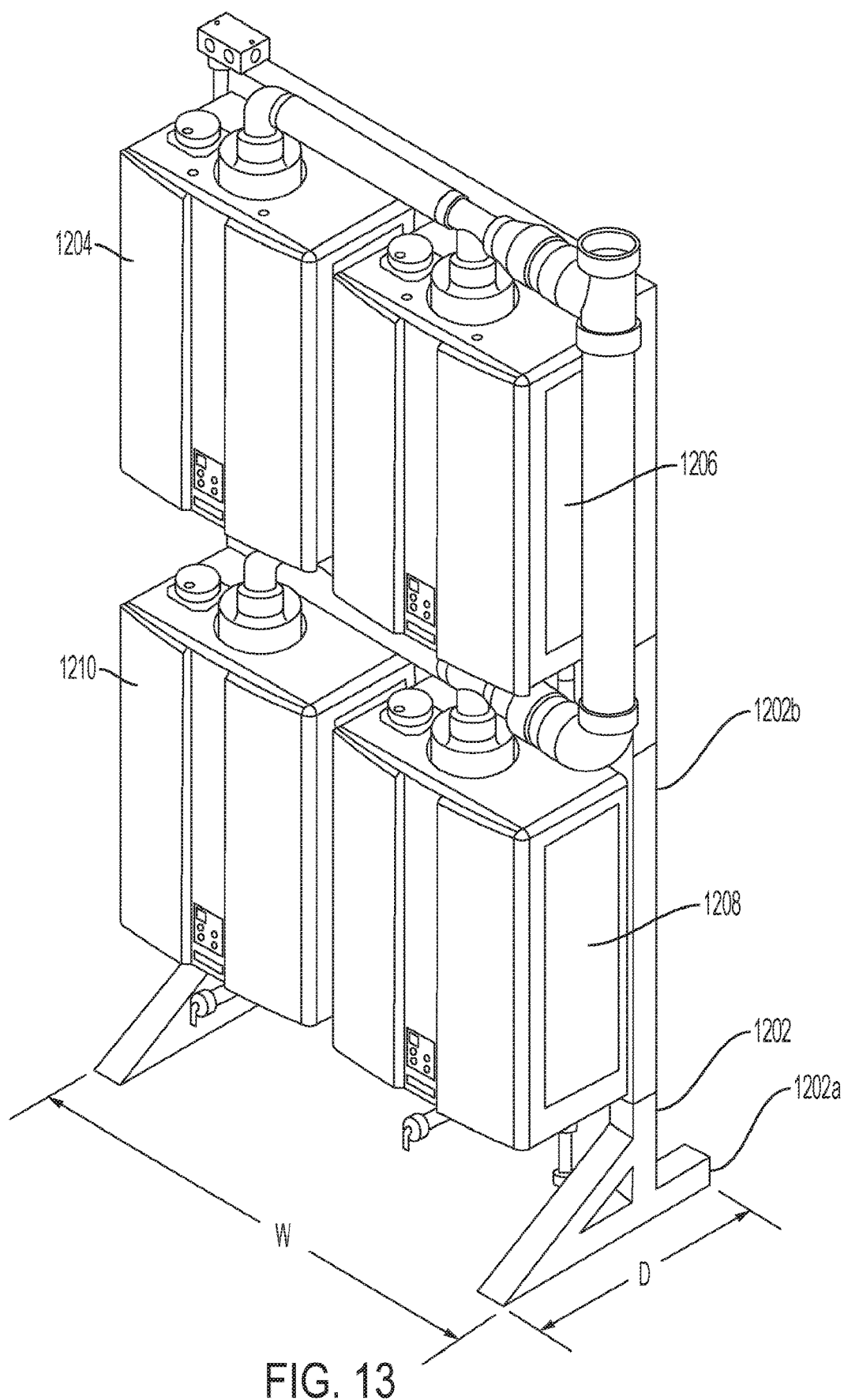
FIG. 13 illustrates a perspective view of the water heating system of FIG. 12.

FIGS. 12-13 illustrate a water heating system 1200 suitable for implementing the several embodiments of the disclosure. FIG. 12 illustrates a front view of the water heating system 1200. FIG. 13 illustrates a perspective view of the water heating system 1200. The water heating system 1200 has a width "W" dimension (or horizontal), a depth "D" dimension, and a height "H" dimension (or vertical).

The water heating system 1200 provides a high capacity hot water system with multiple redundant water heaters to ensure reliable operation within a smaller footprint as redundant tank-based water heaters or traditional multi-unit tankless rack systems. Throughout the pending disclosure, "multiple redundant" means that there is more than one redundant or failover water heater. For example, a water heating system with multiple redundant water heaters has at least three water heaters, a primary water heater and at least two or multiple redundant or failover water heaters. Therefore, in locations with limited utility spaces, the water heating system 1200 provides multiple redundant heating engines in less space than occupied by two traditional hot water tanks.

The water heating system 1200 comprises a freestanding rack 1202 configured to support mounting a first water heater 1204, a second water heater 1206, a third water heater 1208, and a fourth water heater 1210 in a matrix orientation. Throughout the pending disclosure, a "matrix orientation" means that for at least one of the water heaters in the water heating system 1200 there is an adjacent water heater in a horizontal direction and an adjacent water heater in a vertical direction. For example, as shown in FIGS. 12-13, the water heating system 1200 is in a 2×2 matrix orientation. Other matrix orientations are contemplated by this disclosure, such as 2×3, 2×4, 3×2, 4×2, etc. Looking at the first water heater 1204, the second water heater 1206 is adjacent in a horizontal direction and the third water heater 1208 is adjacent in a vertical direction. Likewise, looking at the fourth water heater 1210, the third water heater 1208 is adjacent in a horizontal direction and the second water heater is adjacent in a vertical direction.

In the example shown, the rack comprises a base 1202a and a vertical support 1202b that extends from the base 1202a in a height "H" direction. A bottom surface of the base 1202a is a surface upon which the rack 1202 rests on a substrate or floor in use. The first, second, third, and fourth water heaters 1204, 1206, 1208, 1210 are mounted at distinct height and width locations on the vertical support 902b. A rear surface of the first, second, third, and fourth water heaters 1204, 1206, 1208, 1210 mounts to the rack 1202. By providing the rack 1202 as a freestanding structure, dedicated wall space at an installation location is not needed. The water and gas lines described as part of the water heating system 1200 are secured to the rack 1202 with a slotted strut channel and crush clamps (not shown). Other clamps or other mechanisms for securing the water and gas lines to the rack 1202 are contemplated by this disclosure.

Each of the first, second, third, and fourth water heaters 1204, 1206, 1208, 1210 comprise a fuel inlet (e.g., natural gas or propane inlet), a cold water inlet, and a hot water outlet arranged on a bottom surface. The first, second, third, and fourth water heaters 1204, 1206, 1208, 1210 also each comprise an air intake and an exhaust vent arranged on a top surface. When mounted on the rack 1202, the top surface of the third water heater 1208 faces the bottom surface of the first water heater 1204. Likewise, the top surface of the fourth water heater 1210 faces the bottom surface of the second water heater 1206. At the same time, a side surface of the first water heater 1204 faces a side surface of the second water heater 1206 and a side surface of the third water heater 1208 faces a side surface of the fourth water heater 1210. A front and back surface of the first, second, third, and fourth water heaters 1204, 1206, 1208, 1210 are parallel to each other. A combined width of the first and second water heaters 1204, 1206 is less than a width of the rack 1202. Likewise, a combined width of the third and fourth water heaters 1208, 1210 is less than a width of the rack 1202. In other words, a combined width of the water heaters along one row in the matrix orientation is less than a width of the rack 1202. A combined height of the water heaters along one column in the matrix orientation is less than a height of the rack 1202.

Within each of the first, second, third, and fourth water heaters 1204, 1206, 1208, 1210, fuel from the fuel inlet and air from the air intake is supplied to a burner which is in thermal communication with a heat exchanger. Exhaust gasses from the burner are supplied to the exhaust vent. The water heating system 1200 comprises an air intake manifold (not shown) coupled to the air intake of the first, second, third, and fourth water heaters 1204, 1206, 1208, 1210. The water heating system 1200 comprises an exhaust manifold 1212 coupled to the exhaust vents of the first, second, third, and fourth water heaters 1204, 1206, 1208, 1210. The air intake manifold and/or the exhaust manifold 1212 are configured to be coupled to a building premises air intake line or exhaust vent, respectively. Cold water supplied to the cold water inlet of the first, second, third, and fourth water heaters 1204, 1206, 1208, 1210 flows through the heat exchanger to produce hot water of a desired temperature. The produced hot water is supplied from the hot water outlet of the first, second, third, and fourth water heaters 1204, 1206, 1208, 1210.

The water heating system 1200 comprises a cold water inlet manifold (not shown) for supplying cold water received from a cold water supply source (e.g., a municipal water supply) to the cold water inlet of the first, second, third, and fourth water heaters 1204, 1206, 1208, 1210. The water heating system 1200 also comprises a hot water outlet manifold (not shown) for supplying hot water from the hot water outlet of the first, second, third, and fourth water heaters 1204, 1206, 1208, 1210 to one or more building premises hot water supply lines (not shown). In some implementations, the hot water outlet manifold may connect to the building premises hot water supply line(s) via one or more hot water storage tanks. The water heating system 1200 also comprises a fuel inlet manifold (not shown) for supplying fuel received from a fuel source (e.g., propane tank or municipal natural gas supply) to the fuel inlet of the first, second, third, and fourth water heaters 1204, 1206, 1208, 1210. In some implementations, each of the air intake manifold, exhaust manifold 1212, fuel manifold, cold water manifold, and hot water outlet manifold extend along the rack 1202 in a height "H" direction.

The water heating system 1200 has a width dimension that extends across the rack 1202. In some examples, the width is less than 80, 60, or 55 inches. In an example, the width is 39 inches. In some examples, the water heating system 1200 has a depth dimension of less than 30 inches. In an example, the water heating system 1200 has a depth dimension of 27 inches or less. In some examples, the water heating system 1200 has a height that extends from a bottom of the base 1202*a* to a top of the vertical support 1202*b*. The height of the water heating system 1200 is less than 90, 89, 88, 87, or 86 inches. In an example, the height is 85.39 inches. In some examples, the water heating system 1200 occupies a floor space of less than 15, 10, 9, or 8 square feet. In an example, the water heating system 1200 occupies a floor space of less than or equal to 7.5 square feet. Based on the above, it can be seen that the water heating system 1200 provides for large capacity, multiple redundant water heaters in a small footprint that is less than that required for just two traditional tank water heaters.

While several embodiments have been provided in the present disclosure, the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A water heater rack system, comprising:
    a first post having a first end and a second end, the second end of the first post comprising a first support surface;
    a second post having a first end and a second end, the second end of the second post comprising a second support surface, wherein the first and second support surfaces are coplanar;
    a first heat engine having a first surface coupled across the first post and the second post at a first location between the first and second end of the first and second posts, the first heat engine also having a second surface that is perpendicular to the first surface of the first heat engine, the second surface of the first heat engine having a first hot water outlet and facing towards the first and second support surfaces; and
    a second heat engine having a first surface coupled across the first post and the second post at a second location between the first and second end of the first and second posts, the second heat engine also having a second surface that is perpendicular to the first surface of the second heat engine, the second surface of the second heat engine having a second hot water outlet and facing towards the first and second support surfaces,
    wherein the second heat engine further comprises a third surface that is opposite the second surface of the second heat engine, the third surface of the second heat engine having at least one vent pipe, wherein the second surface of the first heat engine faces the third surface of the second heat engine.

2. The water heater rack system of claim 1, further comprising:
    a first support having a first end that rigidly connects to the first post at a point on the first post between the first end of the first post and the second end of the first post, and a second end that is coplanar with the second end of the first post and set apart from the first post in a direction parallel to the direction in which the first surface of the first heat engine extends away from the first post and the second post;
    a second support that rigidly connects to the second post at a point on the second post between the first end of the second post and the second end of the second post and a second end that is coplanar with the second end of the second post and set apart from the first post in a direction parallel to the direction in which the first surface of the first heat engine extends away from the first post and the second post; and
    a linking bar that connects to the second end of the first support and the second end of the second support.

3. The water heater rack system of claim 1, wherein the first heat engine and the second heat engine are tankless water heaters.

4. The water heater rack system of claim 2, wherein the first support and second support each extend perpendicular to the first post and the second post and the second end of the first support and the second support each extend parallel to the first post and the second post.

5. The water heater rack system of claim 1, further comprising:
    a first cross bar and a second cross bar, each connecting the first post and the second post wherein the first cross bar is further away from the support surfaces than the second cross bar and wherein the first heat engine is coupled to the first cross bar through a first bracket and wherein the second heat engine is coupled to the second cross bar through a second bracket.

6. A water heating and storage system, comprising:
a storage tank with a top surface, a bottom surface, and a sidewall that extends between the top surface and the bottom surface, the storage tank encloses a volume;
a first post having a first end and a second end, the second end of the first post comprising a first support surface;
a second post having a first end and a second end, the second end of the second post comprising a second support surface where a longitudinal axis of the storage tank is parallel with the first post and the second post;
a first heat engine having a first surface coupled across the first post and the second post at a first location between the first and second end of the first and second posts, the first heat engine also having a second surface that is perpendicular to the first surface of the first heat engine, the second surface of the first heat engine having a first hot water outlet and facing towards the first and second support surfaces;
a second heat engine having a first surface coupled across the first post and the second post at a second location between the first and second end of the first and second posts, the second heat engine also having a second surface that is perpendicular to the first surface of the second heat engine, the second surface of the second heat engine having a second hot water outlet and facing towards the first and second support surfaces;
a hot water inlet on the storage tank fluidically coupled to the first and second hot water outlets;
a first support having a first end that rigidly connects to the first post at a point on the first post between the first end of the first post and the second end of the first post, and a second end that is coplanar with the second end of the first post and set apart from the first post in a direction parallel to the direction in which the first surface of the first heat engine extends away from the first post and the second post;
a second support that rigidly connects to the second post at a point on the second post between the first end of the second post and the second end of the second post and a second end that is coplanar with the second end of the second post and set apart from the first post in a direction parallel to the direction in which the first surface of the first heat engine extends away from the first post and the second post; and
a linking bar that connects to the second end of the first support and the second end of the second support.

7. The water heating and storage system of claim 6, wherein a distance between the first post and the second post is no larger than a width of the top surface and the bottom surface.

8. The water heating and storage system of claim 6, further comprising:
a tank cold water inlet;
a tank recirculation outlet positioned on the sidewall above the tank cold water inlet;
a tank recirculation inlet positioned on the sidewall above the tank recirculation outlet;
a storage system recirculation outlet;
a recirculation pump positioned between the tank recirculation outlet and the storage system recirculation outlet, the recirculation pump comprising a pump inlet and a pump outlet; and
an inlet isolation valve positioned between the tank recirculation outlet and the pump inlet,
wherein the pump inlet is in fluid communication with the tank recirculation outlet when the inlet isolation valve is open, and
wherein the pump inlet is fluidically isolated from the tank recirculation outlet when the inlet isolation valve is closed.

9. The water heating and storage system of claim 6, wherein the first heat engine and the second heat engine are tankless water heaters.

10. The water heating and storage system of claim 6, further comprising:
a hot water outlet on the top surface of the storage tank, which is fluidically connected to an upper portion of the storage tank.

11. The water heating and storage system of claim 6, wherein a cold-water inlet is positioned on the sidewall about the bottom surface.

12. The water heating and storage system of claim 6, wherein a tank recirculation inlet is positioned along the sidewall at or above at least at 80% of the volume from the bottom surface.

13. The water heating and storage system of claim 6, wherein a width of the first heat engine and the second engine are no larger than the width of the storage tank top surface and the storage tank bottom surface.

14. The water heating and storage system of claim 13, wherein the width of heat engine casing is no more than the width of the storage tank top surface and the storage tank bottom surface.

15. The water heating and storage system of claim 13, further comprising:
a first cross bar and a second cross bar, each connecting the first post and the second post wherein the first cross bar is further away from the support surfaces than the second cross bar and wherein the first heat engine is coupled to the first cross bar through a first bracket and wherein the second heat engine is coupled to the second cross bar through a second bracket.

16. The water heating and storage system of claim 6, wherein the water heating and storage system is controlled by an integrated control block.

17. The water heating and storage system of claim 6, further comprising:
at least one storage tank connector on a second surface of the first post; and
at least one storage tank connector on a second surface of the second post.

18. A water heater rack system, comprising:
a first post having a first end and a second end, the second end of the first post comprising a first support surface;
a second post having a first end and a second end, the second end of the second post comprising a second support surface, wherein the first and second support surfaces are coplanar;
a first heat engine having a first surface coupled across the first post and the second post at a first location between the first and second end of the first and second posts, the first heat engine also having a second surface that is perpendicular to the first surface of the first heat engine, the second surface of the first heat engine having a first hot water outlet and facing towards the first and second support surfaces;
a second heat engine having a first surface coupled across the first post and the second post at a second location between the first and second end of the first and second posts, the second heat engine also having a second surface that is perpendicular to the first surface of the second heat engine, the second surface of the second heat engine having a second hot water outlet and facing towards the first and second support surfaces;

a first support having a first end that rigidly connects to the first post at a point on the first post between the first end of the first post and the second end of the first post, and a second end that is coplanar with the second end of the first post and set apart from the first post in a direction parallel to the direction in which the first surface of the first heat engine extends away from the first post and the second post;

a second support that rigidly connects to the second post at a point on the second post between the first end of the second post and the second end of the second post and a second end that is coplanar with the second end of the second post and set apart from the first post in a direction parallel to the direction in which the first surface of the first heat engine extends away from the first post and the second post; and a linking bar that connects to the second end of the first support and the second end of the second support.

19. The water heater rack system of claim 18, wherein the first heat engine and the second heat engine are tankless water heaters.

20. The water heater rack system of claim 18, wherein the first support and second support each extend perpendicular to the first post and the second post and the second end of the first support and the second support each extend parallel to the first post and the second post.

21. The water heater rack system of claim 18, further comprising a first cross bar and a second cross bar, each connecting the first post and the second post wherein the first cross bar is further away from the support surfaces than the cross bar surface and wherein the first heat engine is coupled to the first cross bar through a first bracket and wherein the second heat engine is coupled to the second cross bar through a second bracket.

\* \* \* \* \*